United States Patent
Oron et al.

(10) Patent No.: US 11,313,794 B2
(45) Date of Patent: Apr. 26, 2022

(54) HYBRID 3D INSPECTION SYSTEM

(71) Applicant: Orbotech Ltd., Yavne (IL)

(72) Inventors: Ram Oron, Nes Ziona (IL); Hanina Golan, Rishon Lezion (IL); Ilia Lutsker, Kfar Saba (IL); Gil Tidhar, Modiin-Macabim-Reut (IL)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 17/064,212

(22) Filed: Oct. 6, 2020

(65) Prior Publication Data

US 2021/0102892 A1 Apr. 8, 2021

Related U.S. Application Data

(63) Continuation of application No. PCT/IL2020/051062, filed on Sep. 30, 2020.
(Continued)

(51) Int. Cl.
*G03H 1/00* (2006.01)
*G01B 11/24* (2006.01)
(Continued)

(52) U.S. Cl.
CPC ........... *G01N 21/453* (2013.01); *G01B 9/023* (2013.01); *G01B 9/02029* (2013.01);
(Continued)

(58) Field of Classification Search
CPC ................ G01B 11/2441; G01B 11/25; G01B 9/02029; G01B 9/0203; G01B 9/021; G01B 9/023
See application file for complete search history.

(56) References Cited

U.S. PATENT DOCUMENTS 6,181,425 B1   1/2001   Svetkoff et al.
6,249,347 B1   6/2001   Svetkoff et al.
(Continued)

FOREIGN PATENT DOCUMENTS

JP     2015102485 A    6/2015
KR     20190045645 A   5/2019
WO     2004057355 A1   7/2004

OTHER PUBLICATIONS

ISA/IL, ISR and WO for International Application No. PCT/IL2020/051062, dated Dec. 3, 2020.
(Continued)

*Primary Examiner* — Michael A Lyons
(74) *Attorney, Agent, or Firm* — Hodgson Russ LLP

(57) ABSTRACT

An optical inspection apparatus includes an interferometer module, which is configured to direct a beam of coherent light toward an area under inspection and to produce a first image of interference fringes of the area. The apparatus also includes a triangulation module configured to project a pattern of structured light onto the area, and at least one image sensor configured to capture the first image of interference fringes and a second image of the pattern that is reflected from the area. Beam combiner optics are configured to direct the beam of coherent light and the projected pattern to impinge on the same location on the area. A processor is configured to process the first and second images in order to generate a 3D map of the area.

43 Claims, 15 Drawing Sheets

Related U.S. Application Data

(60) Provisional application No. 62/911,279, filed on Oct. 6, 2019.

(51) Int. Cl.

| | | |
|---|---|---|
| *G01B 11/25* | (2006.01) | |
| *G01B 9/023* | (2006.01) | |
| *G01B 9/02* | (2006.01) | |
| *G01N 21/45* | (2006.01) | |
| *G03H 1/04* | (2006.01) | |
| *G03H 1/08* | (2006.01) | |
| *G01B 9/02015* | (2022.01) | |

(52) U.S. Cl.
CPC .......... *G01B 11/2441* (2013.01); *G01B 11/25* (2013.01); *G03H 1/0005* (2013.01); *G03H 1/0443* (2013.01); *G03H 1/0866* (2013.01)

(56) References Cited

U.S. PATENT DOCUMENTS

| | | | |
|---|---|---|---|
| 6,366,357 B1 | 4/2002 | Svetkoff et al. | |
| 6,452,686 B1 | 9/2002 | Svetkoff et al. | |
| 6,522,777 B1 | 2/2003 | Paulsen et al. | |
| 7,199,882 B2 | 4/2007 | Svetkoff et al. | |
| 7,274,470 B2 | 9/2007 | Lemelin et al. | |
| 7,283,250 B2 | 10/2007 | Schmit et al. | |
| 7,505,863 B2 | 3/2009 | Munteanu et al. | |
| 7,525,669 B1 | 4/2009 | Abdollahi | |
| 7,595,894 B2 | 9/2009 | Hu et al. | |
| 7,649,160 B2 | 1/2010 | Colomb et al. | |
| 9,052,294 B2 | 6/2015 | Walton | |
| 9,097,612 B2 | 8/2015 | Kulawiec et al. | |
| 9,318,877 B2 | 4/2016 | Herschbach et al. | |
| 9,798,130 B2 | 10/2017 | Dresel et al. | |
| 10,267,627 B2 | 4/2019 | Du et al. | |
| 2004/0179207 A1 | 9/2004 | Svetkoff et al. | |
| 2007/0279639 A1* | 12/2007 | Hu | G01B 11/25 356/512 |
| 2008/0266547 A1* | 10/2008 | Clark | G01N 21/4738 356/73 |
| 2010/0092040 A1 | 4/2010 | Fischer | |
| 2015/0300803 A1* | 10/2015 | Horimai | G01B 9/02011 356/458 |
| 2017/0003650 A1 | 1/2017 | Moser et al. | |
| 2018/0270474 A1* | 9/2018 | Liu | A61B 6/508 |
| 2019/0049896 A1* | 2/2019 | Cheng | G03H 1/0443 |
| 2019/0128823 A1 | 5/2019 | Berlatzky et al. | |
| 2020/0081236 A1* | 3/2020 | Park | G02B 21/0048 |

OTHER PUBLICATIONS

Naydenova, "Advanced holography-metrology and imaging", Oct. 2011, 388 Pages, IntechOpen.

Guo, "3-D shape measurment Based on Fourier Tranform and phase shifting method", Doctoral dissertation, Dec. 2009, 114 pages, Stony Brook University.

Creath et al.," Moire and fringe projection techniques", Optical shop testing, Second Edition, 1992, pp. 653-685, John Wiley and Sons, inc.

Morimoto et al., "Accuracy of sampling moire method", Proceedings of International Conference on Experimental Mechanics 2008, Aug. 25, 2009, vol. 7375, Issue 737526, SPIE Digital Library, China.

Zhou et al., "Dynamic 3D shape measurement based on the phase-shifting moire algorithm", Proceedings of sixth symposium on Novel Optoelectronic Detection Technology and applications, Apr. 17, 2020, vol. 11455, Issue 114553G, Spie Digital Library.

Moreno, "Embedded Phase Shifting: Robust Phase Shifting With Embedded Signals", Proceedings of the IEEE conference on Computer Vision and Pattern Recognition (CVPR), Jun. 7, 2015, pp. 2301-2309, IEEE Xplore.

Peng, "Algorithms and Models For 3-D Shape Measurement using Digital Fringe Projections", Doctoral dissertation, 2006, 266 pages, University of Maryland.

* cited by examiner

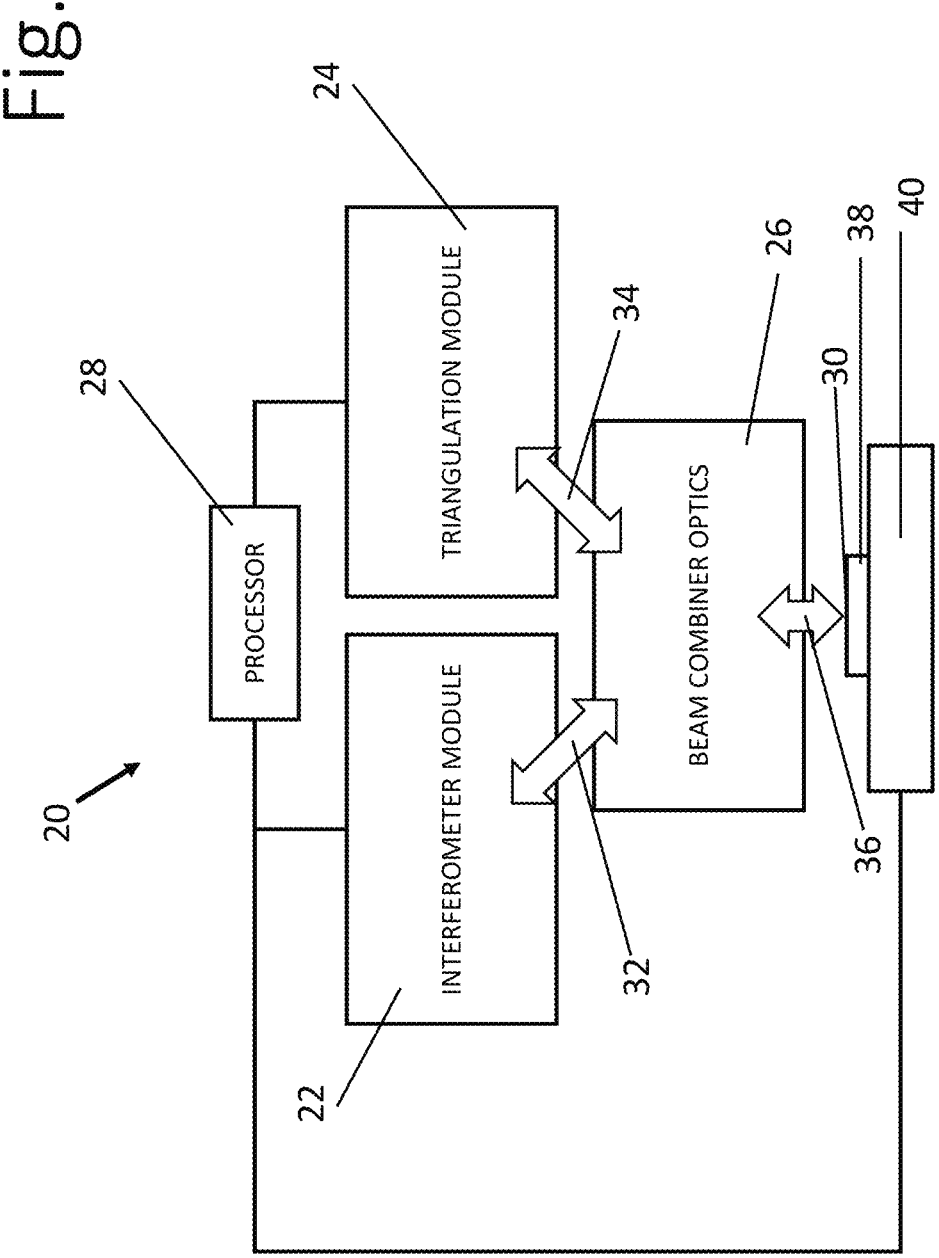

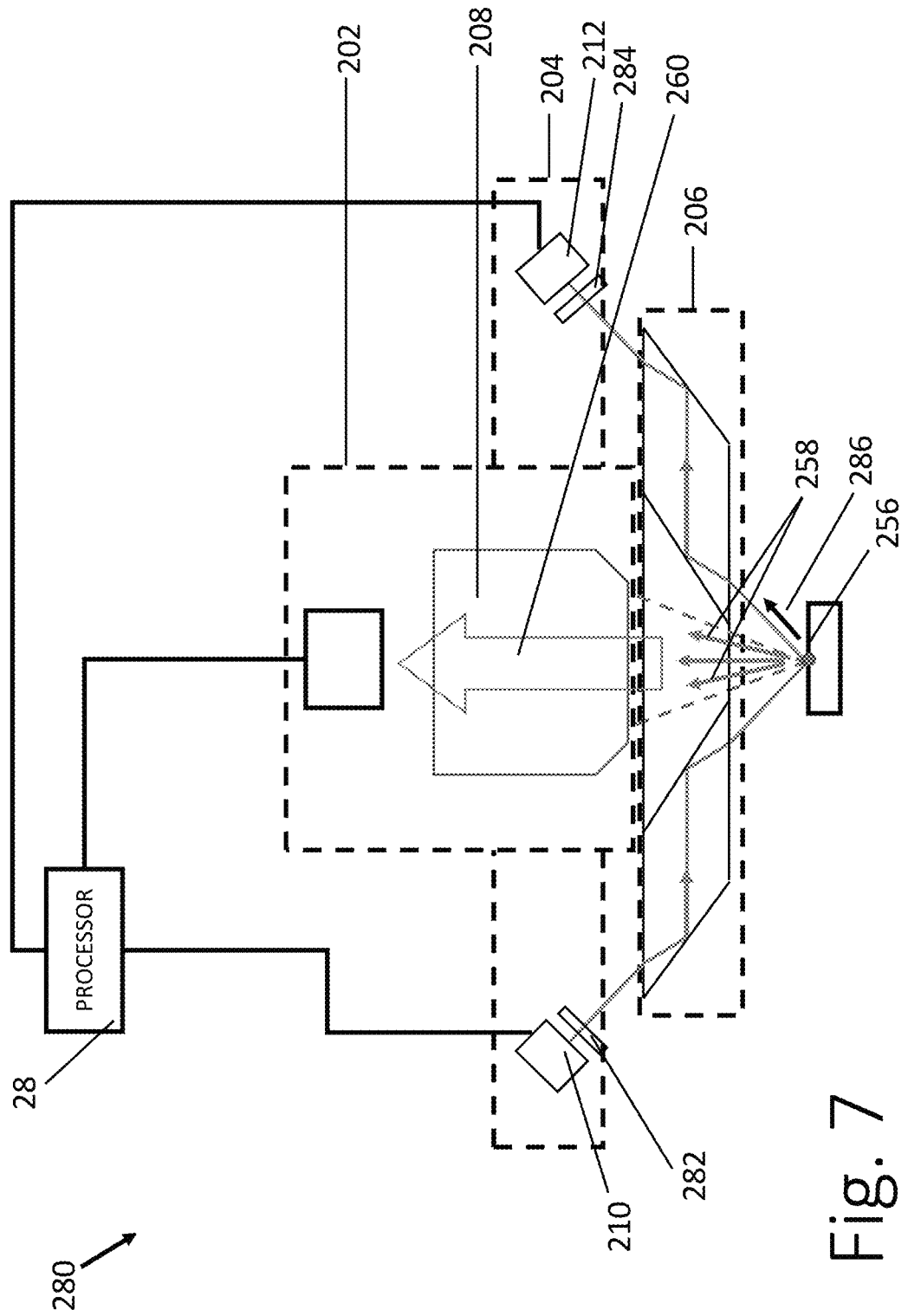

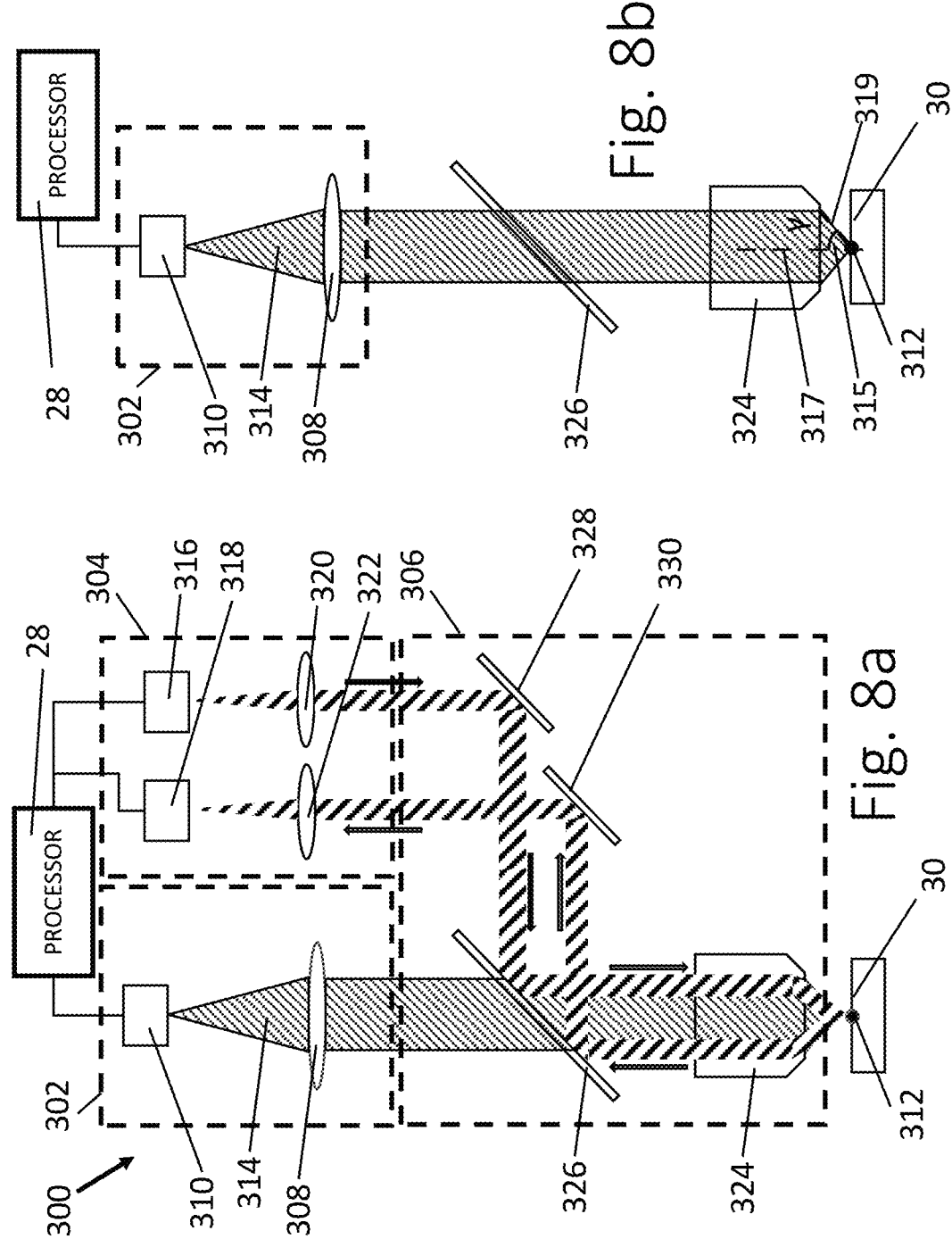

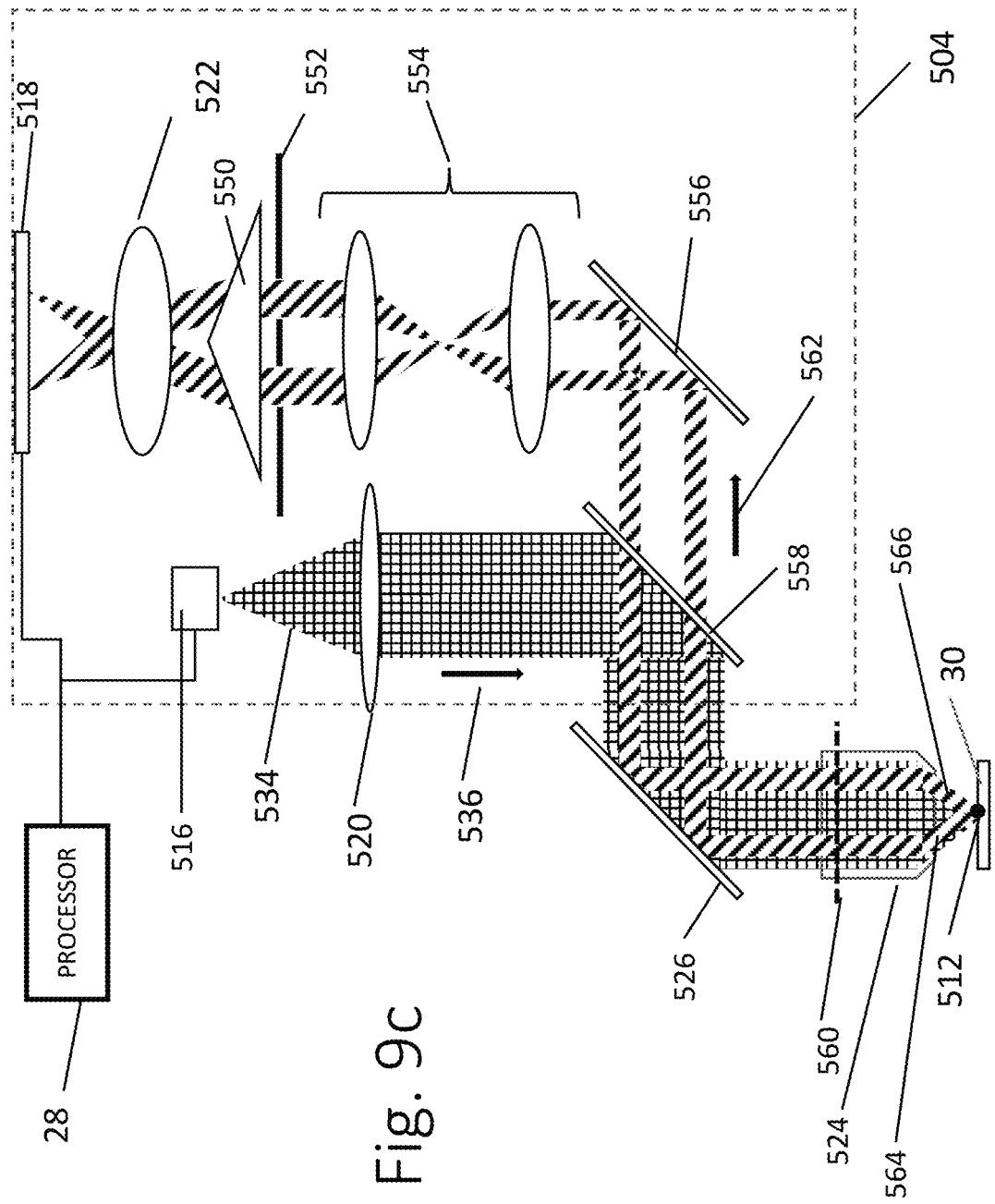

HYBRID 3D INSPECTION SYSTEM

CROSS-REFERENCE TO RELATED APPLICATION

This application is a continuation of PCT/IL2020/051062 filed Sep. 30, 2020, which claims the benefit of U.S. Provisional Patent Application 62/911,279, filed Oct. 6, 2019, both of which are incorporated herein by reference.

FIELD OF THE INVENTION

The present invention relates generally to optical devices, and particularly to inspection and metrology systems.

BACKGROUND

In the production process of workpieces such as printed circuit boards, display panels and integrated circuits, the workpieces are commonly inspected by inspection systems configured to measure the three-dimensional (3D) topography of the features of the circuit board. Various measurement methods may be realized using suitable optical systems. Two of these methods are triangulation and interferometric methods.

The terms "optical," "light" and "illumination," as used in the present description and in the claims, refer generally to any and all of visible, infrared, and ultraviolet radiation.

Some triangulation methods project a pattern of light, for example, a pattern of parallel lines (fringes) of illumination, onto the area under inspection. By observing a two-dimensional (2D) image of the projected pattern reflected either specularly or diffusely from the area under inspection, local shifts of the pattern are seen in response to local topographical variations of the area. An example of this sort of method is the phase shift method, which may be implemented both with static projected fringes and with fringes that are scanned across the area (scanning phase-shift method (SPSM)). In SPSM, the projected fringes have a periodic intensity pattern. The projected fringe pattern is shifted in consecutive steps in a direction transverse to the fringes, with a typical step size of one-quarter of the fringe period when sinusoidally varying fringes are used. Alternatively, other periodic patterns may be used. For example, fringes with a trapezoidal variation across the fringes enables extracting the height information with two steps per period, but with lesser accuracy. The combination of sinusoidal fringes and multiple steps across the fringe period enables the topography of the area, measured from the local fringe shift, to be measured to an accuracy of 0.5 micron.

Triangulation methods are capable of measuring topographic variations of tens or hundreds of microns, with unambiguous measurement results, but they generally cannot reach the resolution of interferometric methods, as described below.

Interferometric methods illuminate the area under inspection with coherent light, direct the light reflected from the area under inspection to interfere with an undisturbed portion of the illumination (so-called reference beam), and infer the 3D topography from the interference pattern. Interferometric methods may be either static or dynamic. In static methods, one interference pattern is obtained and compared to a reference pattern. An example of a static interferometric method is the digital holographic method, described in U.S. Patent Application Publication 2017/0003650. In dynamic methods, the relative phase between light reflected from the area and the reference beam is dynamically changed, resulting in multiple interference patterns, and these patterns are compared to a pattern at a fixed reference time. Interferometric methods are capable of achieving a vertical resolution below 50 nm. Due to the cyclical repetition of the optical waves forming the coherent illumination, however, the measurement results also repeat cyclically with a period of $\lambda/2$ (for reflected light), wherein $\lambda$ denotes the wavelength of the illumination. Thus, the results are ambiguous outside the so-called ambiguity range $\Delta h$. For single-wavelength operation, $\Delta h = \lambda/2$. The ambiguity range of the interferometric method may be further broadened by employing two lasers with different wavelengths $\lambda_1$ and $\lambda_2$. In this case, the ambiguity range will be $\Delta h = (\lambda_1 \times \lambda_2)/(\lambda_2 - \lambda_1)$. Depending on the wavelengths, ambiguity ranges between 5 μm and 15 μm may thus be achieved.

SUMMARY

Embodiments of the present invention that are described hereinbelow provide improved optical inspection systems and methods for inspection.

There is therefore provided, in accordance with an embodiment of the present invention, an optical inspection apparatus, which includes an interferometer module, which is configured to direct a beam of coherent light toward an area under inspection, to receive the beam reflected from the area, and to produce a first image of interference fringes produced by combining the reflected beam with a reference beam. The apparatus further includes a triangulation module, which includes a projector configured to project a pattern of structured light onto the area under inspection, and at least one image sensor configured to capture the first image of the interference fringes and a second image of the pattern that is reflected from the area under inspection. Beam combiner optics are configured to direct the beam of coherent light along a first optical axis to impinge on a location on the area under inspection at a first angle of incidence, and to direct the projected pattern to impinge on the location along a second optical axis, at a second angle of incidence that is different from the first angle of incidence. A processor is configured to process the first and second images in order to extract respective first and second three-dimensional (3D) measurements of the area under inspection, and to combine the first and second 3D measurements in order to generate a 3D map of the area.

In a disclosed embodiment, the apparatus includes a scanning mechanism configured to translate the first and second optical axes across the area under inspection.

In an embodiment, the first 3D measurements are characterized by a first resolution and a first ambiguity range, while the second 3D measurements are characterized by a second resolution that is coarser than the first resolution and a second ambiguity range that is greater than the first ambiguity range, and the processor is configured to combine the first and second 3D measurements so that the 3D map represents the area with the first resolution over the second ambiguity range.

In another embodiment, the first angle of incidence is normal to a surface of the area under inspection, while the second angle of incidence is oblique.

In a further embodiment, the apparatus also includes an objective lens configured to direct both the beam of coherent light and the projected pattern onto the location, wherein a numerical aperture of the objective lens includes a central portion serving the interferometer module and a peripheral portion serving the triangulation module.

In yet another embodiment, the at least one image sensor includes a first image sensor positioned to capture the first image and a second image sensor positioned to capture the second image, and the beam combiner optics are further configured to direct the pattern that is reflected from the area under inspection toward the second image sensor along an oblique angle of departure corresponding to the second angle of incidence.

In a disclosed embodiment, the triangulation module is configured to direct two beams from the area under inspection at different, respective angles to form respective images of the pattern on the at least one image sensor, and the processor is configured to process the respective images together in order to generate the 3D map.

In a further embodiment, the triangulation module includes an aperture plate, which is positioned so as to intercept the reflected pattern and contains two apertures that direct the two beams at the different respective angles toward the at least one image sensor.

In a yet further embodiment, the apparatus includes an objective lens configured to receive and direct the reflected pattern toward the at least one image sensor, wherein the triangulation module images the aperture plate onto an exit pupil of the objective lens and includes a double-wedge configured to direct the two beams respectively through the two apertures.

In a disclosed embodiment, the beam combiner optics include a plurality of optical prisms, which are configured to reflect at least one of the beam of coherent light and the projected pattern so as to direct the beam of coherent light and the projected pattern toward the location at the first and second angles of incidence.

In yet another embodiment, the processor is configured to make the first 3D measurements by measuring first displacements of the interference fringes in the first image relative to a first reference, and to make the second 3D measurements by measuring second displacements of the pattern of the structured light in the second image relative to a second reference.

In a further embodiment, the interferometer module includes a light source configured to emit the coherent light, and the at least one image sensor is configured to capture the first image of the interference fringes.

In a yet further embodiment, the at least one image sensor is configured to capture a two-dimensional (2D) image of the area under inspection. Additionally or alternatively, the processor is configured to segment and analyze the 2D image so as to identify one or more objects in the area, and to apply the first and second 3D measurements in measuring a height of the one or more identified objects.

In another embodiment, the at least one image sensor includes a single image sensor that is configured to capture both the first image of the interference fringes and the second image of the pattern that is reflected from the area under inspection.

In yet another embodiment, the apparatus includes a further image sensor configured to capture a third image of the pattern that is reflected from the area under inspection along an oblique angle of departure corresponding to the second angle of incidence, wherein the processor is configured to process the third image in order to make further 3D measurements of the area under inspection.

In a disclosed embodiment, the interferometer module is configured to produce the first image by self-referenced digital holography.

In another embodiment, the interferometer module is configured to produce the first image by directing two beams of the coherent light with different illumination conditions to impinge on the area under inspection, wherein one of the beams serves as the reference beam.

In yet another embodiment, the interferometer module is configured to derive the reference beam from the beam of the coherent light by optical manipulation of the beam.

In a disclosed embodiment, the triangulation module includes at least one rotatable polarizer, which is configured to vary a polarization state of the projected pattern so as to adjust relative intensities of specular and diffuse reflections in the second image.

In another embodiment, the interferometer module is configured to capture the first image using a digital holographic method.

In yet another embodiment, the triangulation module is configured to capture the second image using a scanning-phase shift method (SPSM).

There is additionally provided, in accordance with an embodiment of the invention, an optical inspection apparatus, including an interferometer module, which is configured to direct a beam of coherent light along a first optical axis to impinge on an area under inspection, to receive the beam reflected from the area, and to produce a first image of interference fringes produced by combining the reflected beam with a reference beam. A triangulation module includes a projector configured to project a pattern of structured light along a second optical axis to impinge on the area under inspection. At least one image sensor is configured to capture the first image of the interference fringes and a second image of the pattern that is reflected from the area under inspection. A scanning mechanism is configured to translate the first and second optical axes in mutual registration across the area under inspection. A processor is configured to drive the scanning mechanism so as to cause the first and second optical axes to impinge in succession on locations in the area under inspection, to process the first and second images in order to extract respective first and second three-dimensional (3D) measurements of the area under inspection, and to combine the first and second 3D measurements in order to generate a 3D map of the area.

There is also provided, in accordance with an embodiment of the present invention, a method for optical inspection, including directing a beam of coherent light toward an area under inspection, receiving the beam reflected from the area, and capturing a first image of interference fringes produced by combining the reflected beam with a reference beam. A pattern of structured light is projected onto the area under inspection, and a second image is captured of the pattern that is reflected from the area under inspection. Beam combiner optics are positioned to direct the beam of coherent light along a first optical axis to impinge on a location on the area under inspection at a first angle of incidence, and to direct the projected pattern to impinge on the location along a second optical axis, at a second angle of incidence that is different from the first angle of incidence. The first and second images are processed in order to extract respective first and second three-dimensional (3D) measurements of the area under inspection, and combining the first and second 3D measurements in order to generate a 3D map of the area.

There is further provided, in accordance with an embodiment of the invention, a method for optical inspection, which includes directing a beam of coherent light along a first optical axis to impinge an area under inspection, receiving the beam reflected from the area, and capturing a first image of interference fringes produced by combining the reflected beam with a reference beam. A pattern of structured light is projected along a second optical axis to impinge the area under inspection, and a second image is captured of the pattern that is reflected from the area under inspection. The first and second optical axes are translated in mutual registration across the area under inspection so as to cause the first and second optical axes to impinge in succession on locations in the area under inspection. The first and second images are processed in order to extract respective first and second three-dimensional (3D) measurements of the area under inspection. The first and second 3D measurements are combined in order to generate a 3D map of the area.

The present invention will be more fully understood from the following detailed description of the embodiments thereof, taken together with the drawings in which:

BRIEF DESCRIPTION OF THE DRAWINGS

FIG. 1 is a block diagram that schematically illustrates an optical inspection apparatus, in accordance with an embodiment of the invention;

FIG. 7 is a schematic side view of an optical inspection apparatus, in accordance with yet a further embodiment of the invention;

FIGS. 8a, 8b and 8c are schematic side views of an optical inspection apparatus, illustrating modes of operation of the apparatus, in accordance with yet another embodiment of the invention;

FIGS. 9a, 9b and 9c are schematic side views of an optical inspection apparatus, illustrating modes of operation of the apparatus, in accordance with still another embodiment of the invention;

DETAILED DESCRIPTION OF EMBODIMENTS

Overview

Figure 2A:
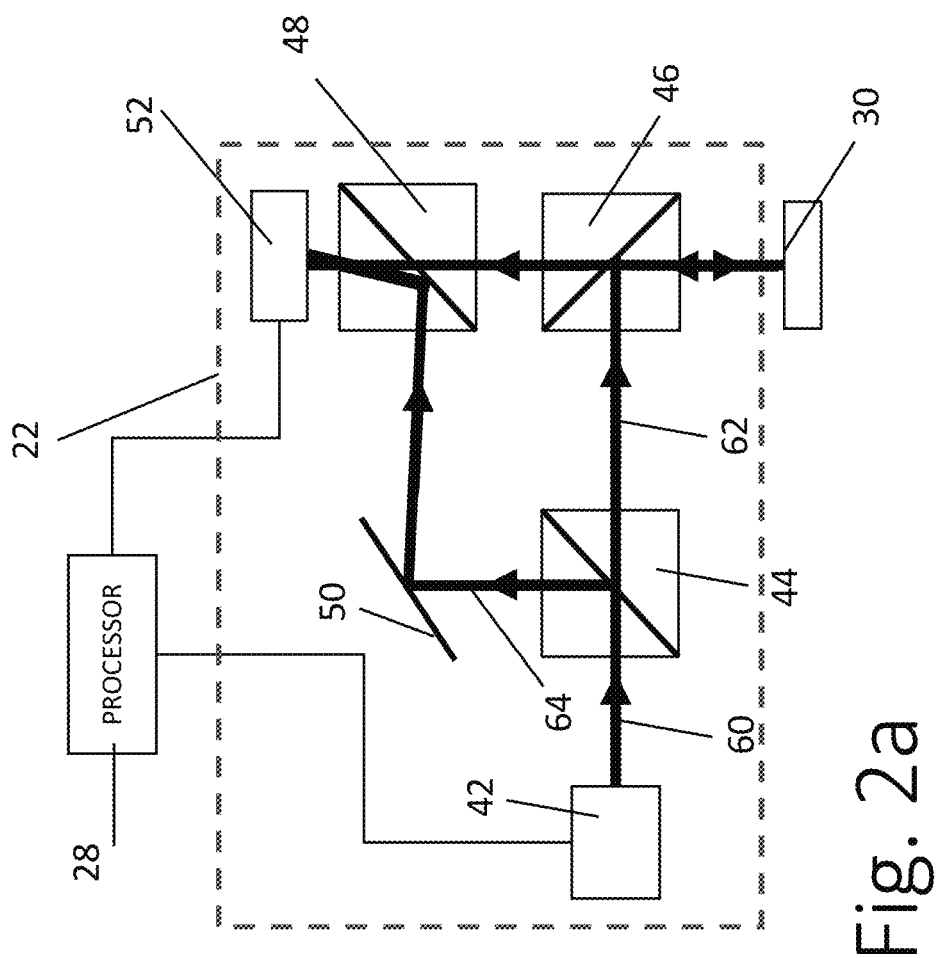
FIGS. 2a and 2b are schematic side views of an interferometer module in the apparatus of FIG. 1, in accordance with an embodiment of the invention.

Optical inspection systems that are used for measuring the 3D topography of workpieces may combine two different, complementary methods. It is advantageous to combine a triangulation module and an interferometer module, as the absolute height measurements given by the triangulation module are complemented by the high measurement accuracy given by the interferometer module: Since the accuracy of the triangulation module is better than the ambiguity range of the interferometer module, the measurement results from the triangulation module may be utilized to break the ambiguity of the interferometric measurements, resulting in accurate and unambiguous interferometric measurements over a large range. In order to combine the 3D measurements given by each of the two methods into one accurate 3D map, it is advantageous that both the triangulation module and the interferometric model view the same area on the workpiece, with their respective fields-of-view in accurate registration with one another.

The embodiments of the present invention that are described herein address the above needs by providing an optical inspection apparatus, which incorporates an interferometer module and a triangulation module with complementing measurement results, so as to provide accurate 3D measurements over a wide range of heights. The apparatus further comprises beam combiner optics that enable accurate mutual registration of the fields-of-view of the two modules.

In the disclosed embodiments, the optical inspection apparatus comprises an interferometer module, a triangulation module, beam combining optics, and a processor. The interferometer module emits a coherent beam of light and divides it into two parts. One part impinges on the area under inspection, reflects from it, and then optically interferes with the other part, producing an interference pattern reflecting the topography of the area. The interference pattern is recorded by the image sensor of the interferometer module.

The triangulation module projects a pattern of structured light onto the area under inspection. In the pictured example, the pattern is projected from an oblique direction, although diffusely reflective surfaces also permit projection perpendicular to the area. The triangulation module further records the pattern reflected from the area (including specular and/or diffuse reflection) using an image sensor oriented along a direction that is angled relative to the direction of projection. The pattern of structured light may be configured as a set of parallel, equispaced lines of light. Alternatively, other patterns may be used, such as two-dimensional periodic and non-periodic patterns.

The beam combiner optics direct the optical axes of both the interferometer module and the triangulation module toward a common location on the area under inspection, thus ensuring accurate mutual registration of the areas seen by the two modules. The interferometer and triangulation modules may make their measurements at each location of interest either concurrently or sequentially. The beam combiner optics divide the numerical aperture (NA) that is used to illuminate and image the area under inspection, with one part of the NA dedicated to the triangulation module, and the other to the interferometric module. For areas with a rough (scattering) surface, the NA of the interferometric module may also be used for imaging the fringe pattern of the triangulation module using the diffusely reflected light.

The processor performs three main tasks:
1. It calculates from the interference image an interferometric phase map across the area under inspection;
2. It calculates from the triangulation data a triangulation height map across the area; and
3. It utilizes the triangulation height map for unwrapping the interferometric phase map, thus obtaining an unambiguous height map with the accuracy of the interferometric measurement across the area.

In some embodiments, the image sensor in the interferometer model also captures two-dimensional (2D) images (bright-field images), using a light source that only illuminates the area under inspection without producing a reference beam. The processor can analyze this 2D image in order to identify features for subsequent inspection, for example, solder bumps, pillars, vias, or defects. After identification, these features may be inspected using both the interferometer and triangulation modules (or alternatively only one of them) to produce a 3D map of the features.

In yet another embodiment, the interferometer and triangulation modules may be used to capture images of structured illumination patterns that are projected onto areas that reflect light both specularly and diffusely. The specularly-reflected light is captured by the image sensor of the triangulation module, as described above. At the same time, some of the diffusely-reflected light may radiate into the NA-space of the interferometer module. The image sensor of the interferometer module may capture an image of this light, and the recorded structured pattern may be analyzed in a similar fashion to the specularly-reflected pattern.

System Description

FIG. 1 is a block diagram that schematically illustrates an optical inspection apparatus 20, in accordance with an embodiment of the invention. Optical inspection apparatus 20 comprises an interferometer module 22, a triangulation module 24, beam combiner optics 26, and a processor 28 coupled to the interferometric and triangulation modules. Apparatus 20 is positioned adjacent to an area 30 of a workpiece 38 or other sample under inspection.

A scanning mechanism, for example a translation stage 40, translates workpiece 38 within apparatus 20 so as to scan the fields of view of interferometer module 22 and triangulation module 24 across the workpiece. (In subsequent figures stage 40 has been omitted for the sake of simplicity.) Alternatively or additionally, the scanning mechanism may shift other elements of apparatus 20 relative to the workpiece. Stage 40 (or another scanning mechanism) may hold workpiece 38 stationary relative to interferometer module 22 and triangulation module 24 while measurements are performed. Alternatively, interferometer module 22 and triangulation module 24 may be configured to perform their measurements in motion, i.e., while stage 40 moves workpiece 38.

As shown in detail in the figures that follow, beam combiner optics 26 direct the respective optical axes of interferometer module 22 and triangulation module 24 to impinge in mutual registration on a location in area 30. In some embodiments, the beam combiner optics are configured so that the axes are both incident precisely at the same location in area 30. In other embodiments, the locations at which the optical axes are incident on area 30 may be offset one from the other, typically by a small, known distance, and the motion of stage 40 causes the axes to be incident on each location in area 30 at different, known times.

In an alternative embodiment (not shown in the figures), apparatus 20 does not comprise beam combiner optics 26, and the optical axes of interferometer module 22 and triangulation module 24 are incident on area 30 at different locations, along separate paths. The offset between the locations of incidence is known and accurately controlled. Processor 28 drives stage 40 so as to translate area 30 between the respective fields of view (FOVs) of interferometer module 22 and triangulation module 24 with accurate registration between the two FOVs. For example, processor 28 drives stage 40 to position area 30 to coincide with the FOV of interferometer module 22 at an instance of time T, at which time the interference module captures an interference image. Processor 28 then drives stage 40 to move area 30 to coincide with the FOV of triangulation module 24 at an instance of time T+ΔT, at which time the triangulation module captures an image of the structured illumination pattern. This mode of operation enables the processor to combine the 3D measurements made by modules 22 and 24, even in the absence of the beam combiner optics.

Interferometer module 22, triangulation module 24, and beam combiner optics 26 will be further detailed in subsequent figures.

Processor 28 comprises a programmable processor, which is programmed in software and/or firmware to carry out the functions that are described herein. Additionally or alternatively, at least some of the functions of processor 28 may be carried out by hardware logic circuits, which may be hard-wired or programmable. In either case, processor 28 has suitable interfaces for receiving and transmitting data and instructions to and from other elements of apparatus 20 as described below.

The flow of optical signals between interferometer module 22, triangulation module 24, beam combiner optics 26, and area 30 is schematically indicated by arrows 32, 34, and 36: Arrow 32 indicates the two-way flow of optical signals between interferometer module 22 and beam combiner optics 26, arrow 34 indicates the two-way flow of optical signals between triangulation module 24 and beam combiner optics 26, and arrow 36 indicates the two-way flow of optical signals between beam combiner optics 26 and area 30. Arrow 36 represents optical signals to and from both interferometer and triangulation modules 22 and 24.

Figure 2B:
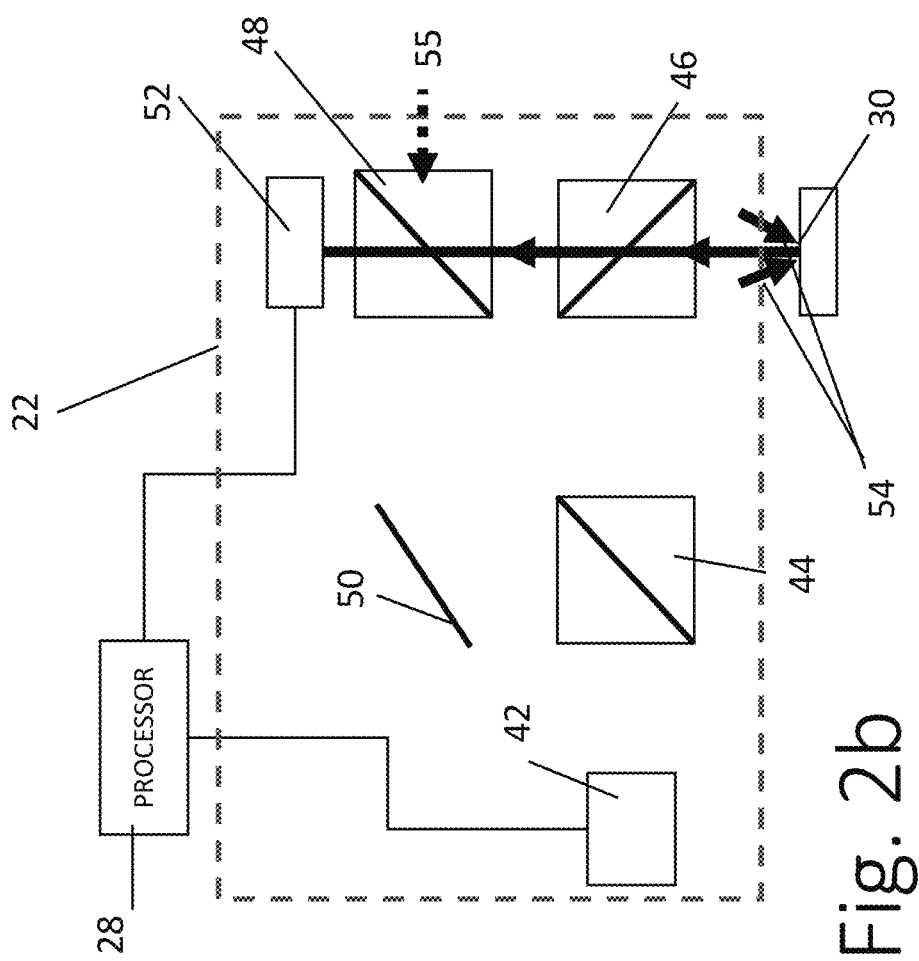

FIGS. 2a and 2b are schematic side views of interferometer module 22 in two different modes of operation, in accordance with an embodiment of the invention. These figures show one simplified, representative configuration of interferometer module 22.

Interferometer module 22 comprises a coherent light source 42, three beamsplitters 44, 46, and 48, a mirror 50, and a first image sensor 52. In addition, module 22 may comprise a second light source, which is omitted from the figures for the sake of simplicity. The illumination from this source that impinges on area 30 is indicated by arrows 54 in FIG. 2b. Alternatively, the illumination may be directed through beamsplitter 48, as indicated by a dotted-line arrow 55. Other optical components, such as lenses for expanding and collimating the light emitted by source 42, as well as for imaging area 30 onto sensor 52, are similarly omitted for simplicity's sake.

Coherent light source 42 typically comprises a dual-wavelength continuous-wave laser, although other sources, such as single-wavelength lasers, narrow-band gas discharge sources or pulsed lasers (single- or dual-wavelength), may alternatively be used. As described above, using a laser with two wavelengths $\lambda_1$ and $\lambda_2$ (or one laser with wavelength $\lambda_1$ and another with $\lambda_2$) yields an extended ambiguity range of $\Delta h=(\lambda_1 \times \lambda_2)/(\lambda_2-\lambda_1)$. Source 42 may also be strobed or pulsed in order to synchronize the coherent illumination with possible motion of workpiece 38 moved on stage 40, as well as synchronizing with the measurements by triangulation module 24.

Beamsplitters 44, 46, and 48 are represented as cube beamsplitters. Alternatively, other kinds of beamsplitters, such as plate beamsplitters, may be used. Mirror 50 typically comprises a front-surface mirror, coated either by a metallic coating, such as aluminum, or by a dielectric multilayer coating. Sensor 52 comprises a pixelated camera, such as a CCD (charge-coupled device) or CMOS (complementary metal-oxide semiconductor) camera.

FIG. 2a illustrates the interferometric functionality of interferometer module 22. Laser 42 emits a coherent light beam 60. Beamsplitter 44 divides light beam 60 into a main beam 62 and a reference beam 64. Main beam 62 is reflected by beamsplitter 46 to impinge onto area 30, from which it is reflected back towards beamsplitter 46, further passing through beamsplitter 46 and beamsplitter 48, and impinging on sensor 52. Reference beam 64 is reflected by beamsplitter 44 and further by mirror 50 and beamsplitter 48, and impinges on sensor 52, where it combines coherently with main beam 62 to produce one or more interferometric images (depending whether static or dynamic interferometry is used) of area 30. Processor 28 reads the interferometric image(s), and calculates an interferometric phase map of area 30.

Main and reference beams 62 and 64, respectively, may be either collinear or at a non-collinear angle in impinging on sensor 52. FIG. 2a shows them at a non-collinear angle, which is implemented by an appropriate turn of mirror 50. Such a non-collinear angle is beneficial when using the digital holographic method, as described in the above-mentioned U.S. Patent Application Publication 2017/0003650.

FIG. 2b illustrates the non-interferometric function of interferometer module 22 in generating a 2D (non-interferometric) image of area 30 on sensor 52. In this mode of operation, laser 42 may be turned off, as shown by the absence of beams 60, 62, and 64. Instead, the second light source is turned on, illuminating area 30, as indicated by arrows 54 or by arrow 55. A 2D non-interferometric image of area 30 is now captured by sensor 52. Processor 28, analyzes this image in order to identify image features for subsequent 3D mapping, for example, solder bumps, pillars, vias, or defects.

In an alternative embodiment, a 2D image may be generated by using laser 42 to emit coherent beam 60, but simultaneously blocking reference beam 64, for example by a suitably positioned shutter (not shown).

Figure 3:
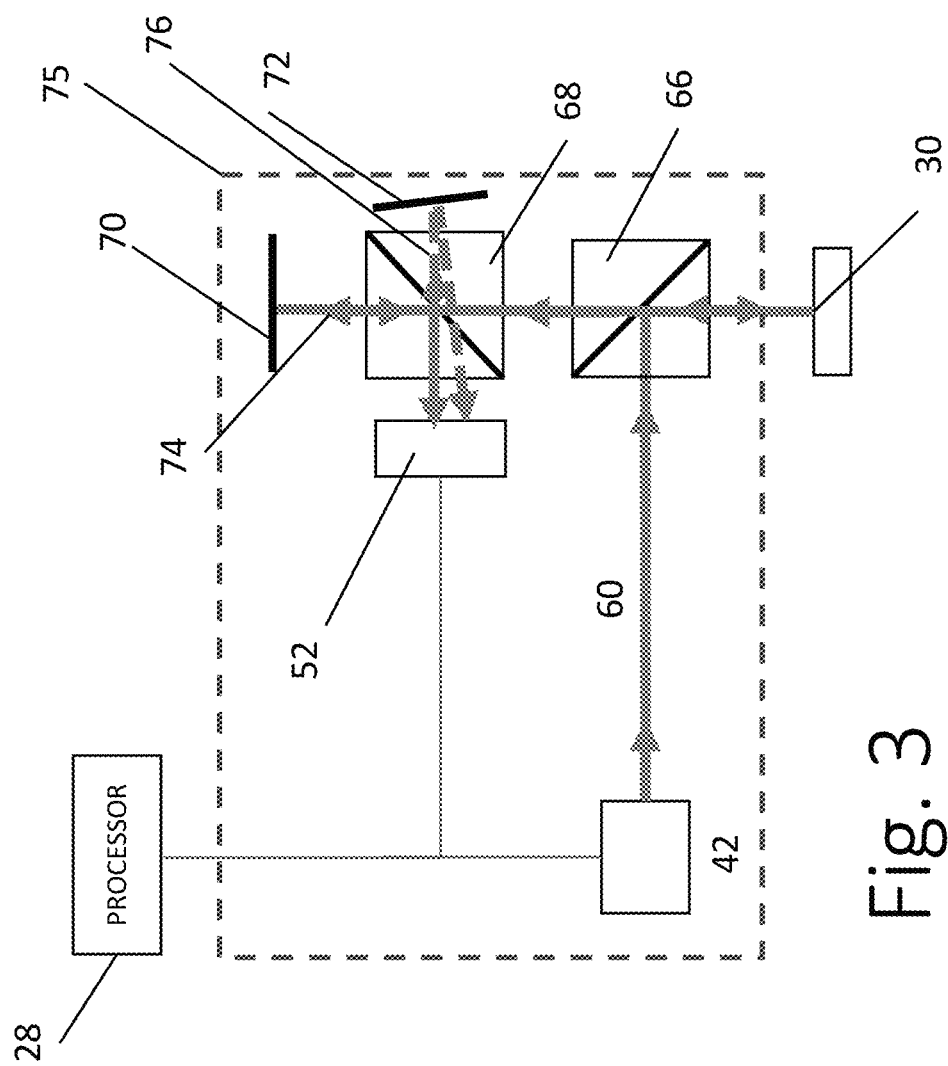
FIG. 3 is a schematic side view of an interferometer module in the apparatus of FIG. 1, in accordance with another embodiment of the invention.

FIG. 3 is a schematic side view of an interferometer module 75, in accordance with another embodiment of the invention. This figure shows in a simplified fashion an alternative configuration for interferometer module 22 of FIG. 1, wherein a self-referenced, or common-path digital holography method is used. In this method, a part of the beam reflected from the sample (sample beam) is split off to serve as a reference beam. The two beams are subsequently recombined with a small angle between their directions of propagation, forming a shearing interference pattern. Alternatively, other types of shearing interferometers, as are known in the art, may be used in this context. The same labels are used to indicate items identical or similar to the corresponding items in FIGS. 2a-2b.

Interferometer module 75 comprises coherent light source 42, beamsplitters 66 and 68, mirrors 70 and 72, and first image sensor 52. Other optical components, such as lenses for expanding and collimating the light emitted by source 42, as well as for imaging area 30 onto sensor 52, are omitted for simplicity's sake.

Beamsplitters 66, and 68 are represented as cube beamsplitters. Alternatively, other kinds of beamsplitters, such as plate beamsplitters, may be used. Mirrors 70 and 72 typically comprise front-surface mirrors, coated either by metallic coatings, such as aluminum, or by dielectric multilayer coatings.

FIG. 3 further illustrates the interferometric functionality of interferometer module 75. As in FIG. 2a, laser 42 emits coherent light beam 60. Beamsplitter 66 directs light beam 60 to impinge on area 30, from which it is reflected back towards beamsplitter 66, further passing through beamsplitter 66 and reaching beamsplitter 68, where it is divided into two beams: a reference beam 76 and a main beam 74. Main beam 74 is reflected by mirror 70 and by beamsplitter 68 toward sensor 52. Reference beam 76 is reflected back by mirror 72 at a small angle with respect to its original direction, and then transmitted by beamsplitter 68 to sensor 52, where it combines coherently with main beam 74 to produce one or more interferometric images of area 30. Processor 28 reads the interferometric image(s), and calculates an interferometric phase map of area 30.

Alternatively, the reference beam may be split off from the sample beam before impinging on area 30. Both beams are then used for illuminating area 30 with different illumination conditions, such as, for example, polarization, angle of incidence on area 30, or numerical aperture (NA). After illuminating area 30, the two beams impinge on sensor 52, producing one or more interferometric images of the area. Alternatively, the reference beam may be derived from the sample beam through optical manipulation, such as spatial filtering and/or the introduction of additional optical components into its optical path, such as a phase plate.

Alternatively to the schemes illustrated in FIGS. 2a and 3, any other suitable sort of imaging interferometer that is known in the art may be adapted for the present purposes.

First Embodiment

Figure 4:
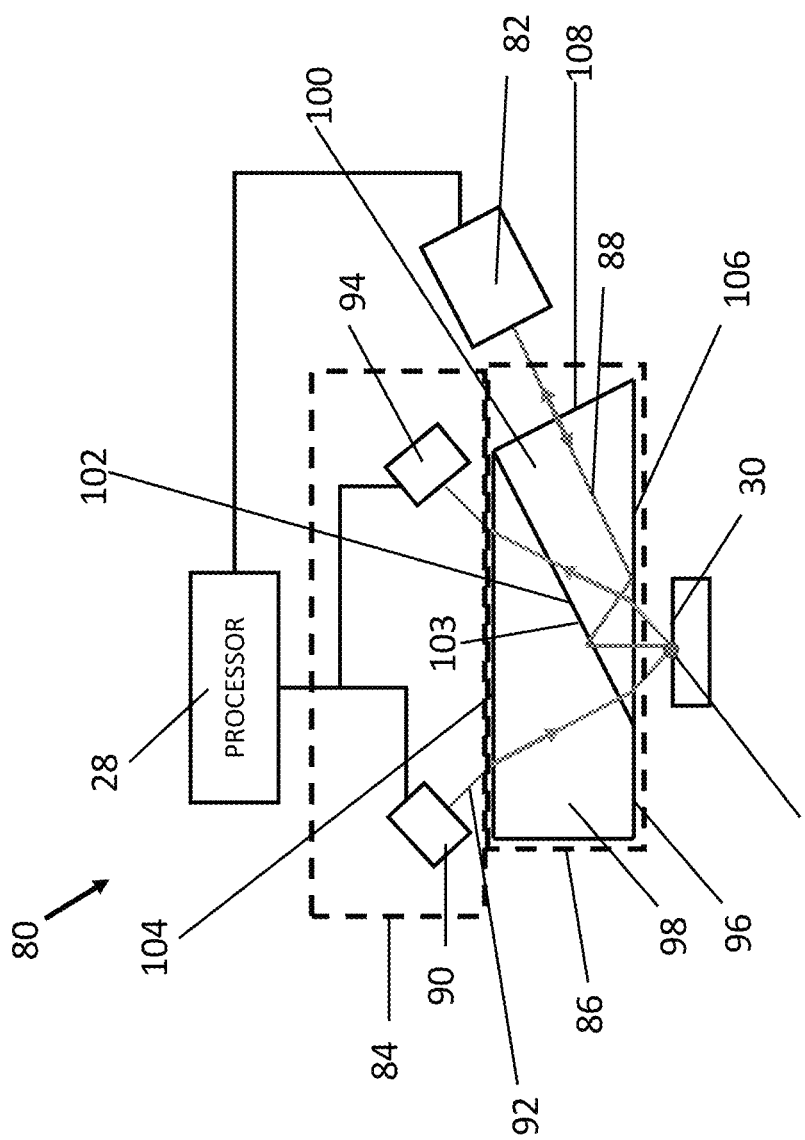
FIG. 4 is a schematic side view of an optical inspection apparatus, in accordance with an embodiment of the invention.

FIG. 4 is a schematic illustration of an optical inspection apparatus 80, in accordance with an embodiment of the invention. Like apparatus 20, apparatus 80 comprises an interferometer module 82, a triangulation module 84, and beam combining optics 86, along with processor 28.

Interferometer module 82 is similar to interferometer module 22 shown in FIG. 2a, and emits and receives a beam of coherent light along a first optical axis 88, which is directed by beam combining optics 86 to impinge on area 30.

Triangulation module 84 comprises a projector 90, which projects one or more patterns of structured light along a second optical axis 92 onto area 30. When using the SPSM (scanning-phase shift method), projector 90 projects straight-line periodic fringe patterns, wherein the fringes have a sinusoidally varying intensity, and wherein the consecutive fringe patterns are shifted typically by a quarter of a fringe period. For the remainder of the specifications, we will refer to this kind of four-step SPSM, although other methods, such as static phase shift, SPSM with a different number of steps (with a minimum of three), or pseudo-random or random two- or three-dimensional patterns, may be used.

Projector 90 may include interchangeable projected patterns to enable varying the range and accuracy of the measurement. Additionally, the projected pattern may be composed of, for example, several sub-patterns of different frequencies, in order to enable both a large measurement range and a high measurement resolution (accuracy). These schemes for projected patterns are also applicable to the pattern projectors illustrated in subsequent FIGS. 5, 6, 7, 8a, 8c, 9a, and 9c.

Triangulation module 84 further comprises a second image sensor 94, typically comprising a pixelated camera, such as a CCD or CMOS camera. For the sake of simplicity, optical components for projecting the fringe pattern onto area 30 and imaging the area onto sensor 94 have been omitted.

Beam combining optics 86 in this example comprise a compound prism 96, comprising a first prism 98 and a second prism 100, which are joined along a common interface 102. Compound prism 96 comprises three input/output faces: a first face 104, a second face 106, and a third face 108. Prisms 98 and 100 are manufactured from an optically transparent material, such as glass. Interface 102 comprises an optical coating 103 between prisms 98 and 100, typically either a dielectric or hybrid multilayer coating, which transmits and reflects optical beams, as will be detailed below. Input/output faces 104, 106, and 108 may be coated with suitable optical antireflection coatings.

Second optical axis 92 of projector 90 impinges on first face 104, where it refracts and enters into first prism 98. It is transmitted via interface 102 into second prism 100. Coating 103 may be designed with wavelength and/or polarization selectivity so as to transmit nearly all the light propagating along second optical axis 92 from projector 90. Alternatively, coating 103 may comprise a simple, non-selective 50/50 beamsplitter coating. Optical axis 92 impinges on second face 106, is transmitted by it, and subsequently impinges on area 30. Second optical axis 92 is now specularly reflected by area 30, transmitted by second face 106 into compound prism 96 and further into interface 102, and subsequently exits through first face 104 and impinges on sensor 94. Sensor 94 captures images of the patterns on area 30. Processor 28, coupled to the sensor, measures the displacements of the fringe patterns in the images relative to a second reference image, and from these measured displacements calculates a triangulation height map of area 30.

Processor 28 subsequently combines the interferometric phase map and the triangulation height map into a final 3D map, utilizing the absolute height measurements of the triangulation height map to remove any ambiguities in the interferometric phase map. The calculation of both the interferometric phase map and the triangulation height map, as well as combining them, will be detailed in FIG. 10, below.

Beam combining optics 86, together with interferometric and triangulation modules 82 and 84, respectively, are configured so that the respective optical axes 88 and 92 impinge on area 30 at a common location 110. The fields-of-view of interferometric and triangulation modules 82 and 84 may coincide precisely or at least closely enough to ensure accurate registration and combination of the interferometric phase map and the triangulation height map. Beam combining optics 86 can also utilize the inherent division in the NA-space between interferometric and triangulation modules 82 and 84: The interferometer module works best when its optical axis 88 impinges on area 30 at a normal angle, whereas the triangulation module uses a non-normal angle for optical axis 92 at the area under inspection.

Second Embodiment

Figure 5:
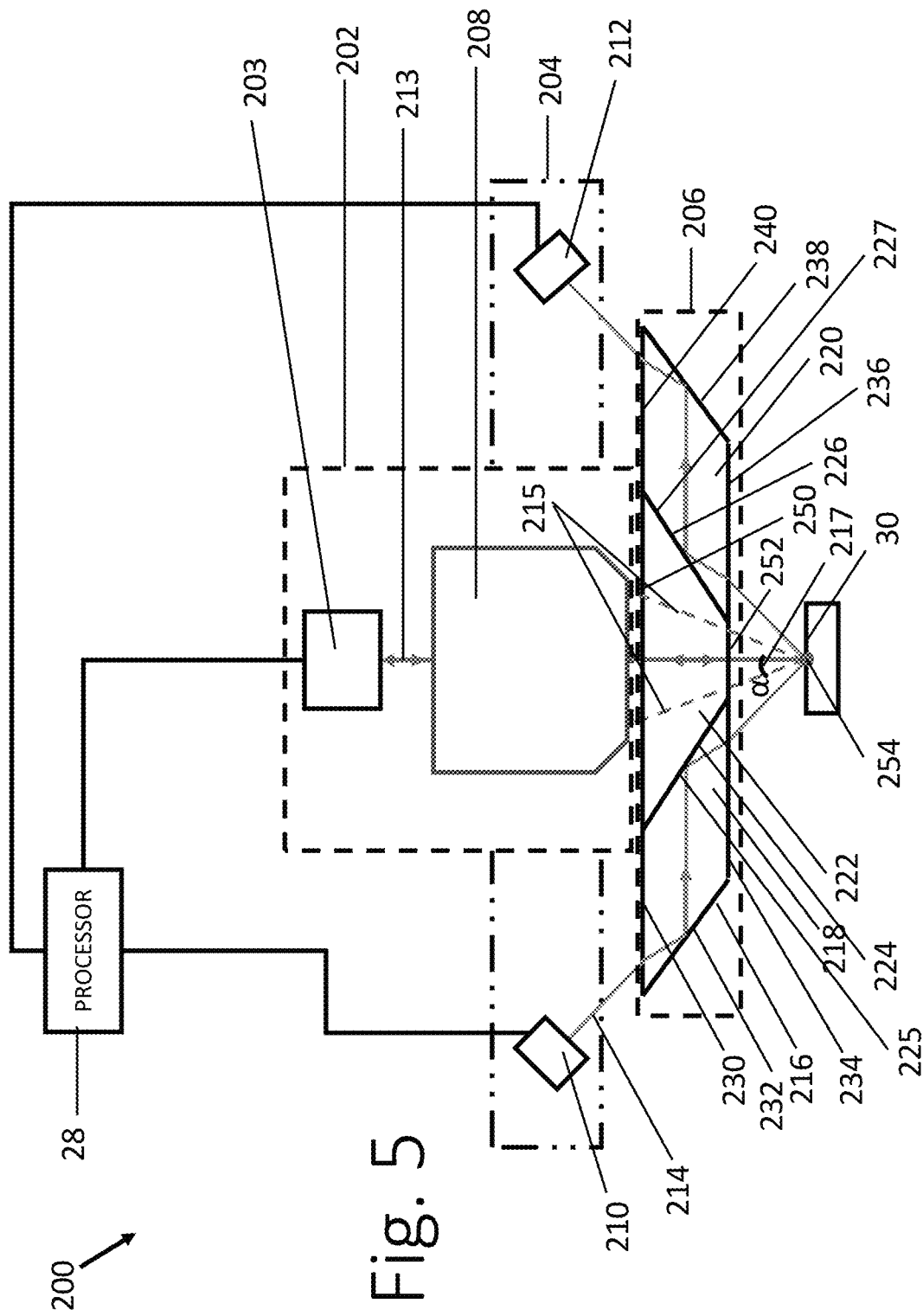
FIG. 5 is a schematic side view of an optical inspection apparatus, in accordance with another embodiment of the invention.

FIG. 5 is a schematic side view of an optical inspection apparatus 200, in accordance with another embodiment of the invention. As in the preceding embodiments, apparatus 200 comprises an interferometer module 202, a triangulation module 204, and beam combining optics 206, together with processor 28.

Interferometer module 202 is similar to interferometer module 22 in FIG. 2a and to interferometer module 82 in FIG. 4, with the exception that an objective lens 208, which is a part of interferometer module 202, is explicitly shown in FIG. 5. The rest of interferometer module 202 is schematically shown as a block 203, with details omitted for the sake of simplicity. Objective lens 208 images area 30 onto the sensor of interferometer module 202 (not shown in FIG. 5, but similar to sensor 52 in FIGS. 2a and 2b). Interferometer module 202 has an optical axis 213, along which it emits and receives a beam of coherent light. As described above, processor 28 calculates, based on the images from interferometer module 202, an interferometric phase map of area 30.

Triangulation module 204 functions in a similar way as triangulation module 84, shown in FIG. 4, and comprises a projector 210 and a second image sensor 212, which are similar to projector 90 and sensor 94 in FIG. 4. Triangulation module 204 projects a fringe pattern along a second optical axis 214, as will be detailed below.

Beam combining optics 206 comprise a compound prism 216, comprising a first prism 218, a second prism 220, and a third prism 222. Prisms 218, 220, and 222 are manufactured from an optically transparent material, such as glass. First prism 218 and third prism 222 are joined along a first common interface 224, and second prism 220 and third prism 222 are joined along a second common interface 226. Interfaces 224 and 226 comprise optical coatings 225 and 227, respectively, typically either a dielectric or hybrid multilayer coating, which reflect the beams of triangulation module 204, as will be detailed below. Alternatively, as in coating 103, coatings 225 and 227 may comprise simple, non-selective 50/50 beamsplitter coatings. Prisms 218, 220, and 222 comprise the following input/output faces: Prism 218 comprises a first face 230, a second face 232, and a third face 234. Prism 220 comprises a fourth face 236, a fifth face 238, and a sixth face 240. Prism 222 comprises a seventh face 250, and an eighth face 252. Faces 230, 234, 236, 240, 250, and 252 may be coated by optical antireflection coatings. Faces 232 and 238 are coated by reflective coatings (either hybrid or dielectric multilayer coatings). Alternatively, faces 232 and 238 may be left uncoated, provided that they reflect, through total internal reflection (TIR), the projected fringe patterns, as will be detailed below.

Interferometer module 202 emits a coherent beam along optical axis 213, which is perpendicular to area 30, illuminating the area through seventh and eighth faces 250 and 252 of prism 222 with a cone of light delineated by dotted lines 215. (For the sake of simplicity, the refraction of dotted lines 215 in third prism 222 has been omitted.) The numerical aperture (NA) of this cone is given by NA=sin(α), where α is the extent of an angle 217 between one of lines 215 and first optical axis 213. The reflected coherent illumination returns to interferometer module 202 along optical axis 213.

Projector 210 projects fringe patterns along optical axis 214. Optical axis 214 enters through first face 230 into first prism 218, is reflected from second face 232 (either by reflection from a reflective coating or by TIR), is again reflected by first common interface 224, and exits the first prism through third face 234, impinging on area 30. From area 30, second optical axis 214 is reflected specularly, enters second prism 220 through fourth face 236, is reflected by second common interface 226 and then (similarly to reflection from second face 232) reflected from fifth face 238, and exits prism 238 through sixth face 240. Subsequently, second optical axis 214 impinges on image sensor 212, which captures images of the fringe patterns for processing by processor 28, as described above.

As in the preceding embodiments, beam combining optics 206 are designed so that first and second optical axes 213 and 214, respectively, impinge on area 30 at a common location 254. The structure of prisms 218, 220, and 222 in beam combining optics 206 ensures a separation between the numerical apertures (angular spaces) of interferometer module 202 and triangulation module 204.

In an alternative embodiment (not shown in the figures), third prism 222 may be omitted from beam combining optics, in which case common interfaces 224 and 226 become glass/air interfaces, similar to faces 232 and 238.

Figure 6:
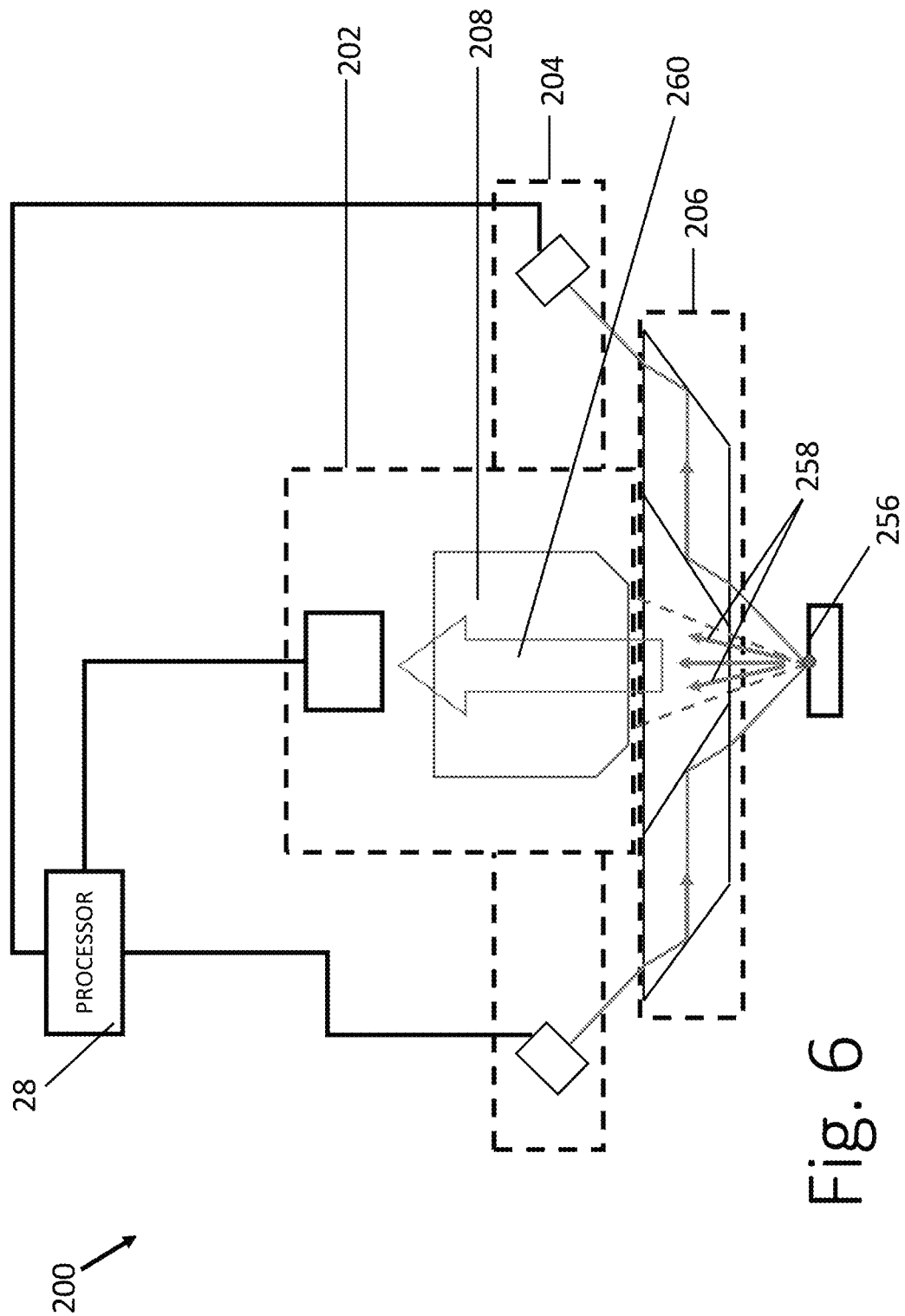
FIG. 6 is a schematic side view of the optical inspection apparatus of FIG. 5, illustrating operation of the apparatus in mapping an area under inspection, in accordance with a further embodiment of the invention.

FIG. 6 is a schematic side view of optical inspection apparatus 200, as described above, illustrating use of the apparatus in mapping an area 256 under inspection, in accordance with a further embodiment of the invention. For the sake of simplicity, most of the labels used in FIG. 5 have been omitted from FIG. 6.

In this example, the surface of area 256 reflects both specularly and diffusely. Light that reflects specularly from area 256 is utilized both by interferometer module 202 and triangulation module 204 as already described in the context of FIG. 5. However, a part of the fringe pattern illuminating area 256 is reflected diffusely into the numerical aperture of objective lens 208, as shown by arrows 258. This light is further conveyed into interferometer module 202, as shown by an arrow 260.

The fringe pattern conveyed by the diffusely-reflected light is captured by the image sensor in interferometer module 202. Processor 28 now utilizes the images captured by the image sensor of interferometer module 202 for calculating a further 3D map, which is similar to the triangulation height map calculated from the images captured by the image sensor in triangulation module 204. The use of this further 3D map is especially advantageous when area 256 has a highly diffusive surface.

Third Embodiment

FIG. 7 is a schematic side view of an optical inspection apparatus 280, in accordance with a yet further embodiment of the invention. Apparatus 280 is identical to apparatus 200 of FIGS. 5-6, with the addition of polarizers 282 and 284 to projector 210 and sensor 212, respectively, in triangulation module 204. Area 30 may comprise both surfaces with high specular reflectivity, such as metallic surfaces, and surfaces, comprising non-metallic materials for example, with low specular but possibly higher diffuse reflectivities. By adjusting the rotational angles of polarizers 282 and 284, the relative intensities of specularly reflected light and diffusely reflected light propagating along a direction 286 toward image sensor 212 may be balanced, thus permitting simultaneous measurements of fringe patterns from both kinds of surfaces.

Fourth Embodiment

Figure 8C:
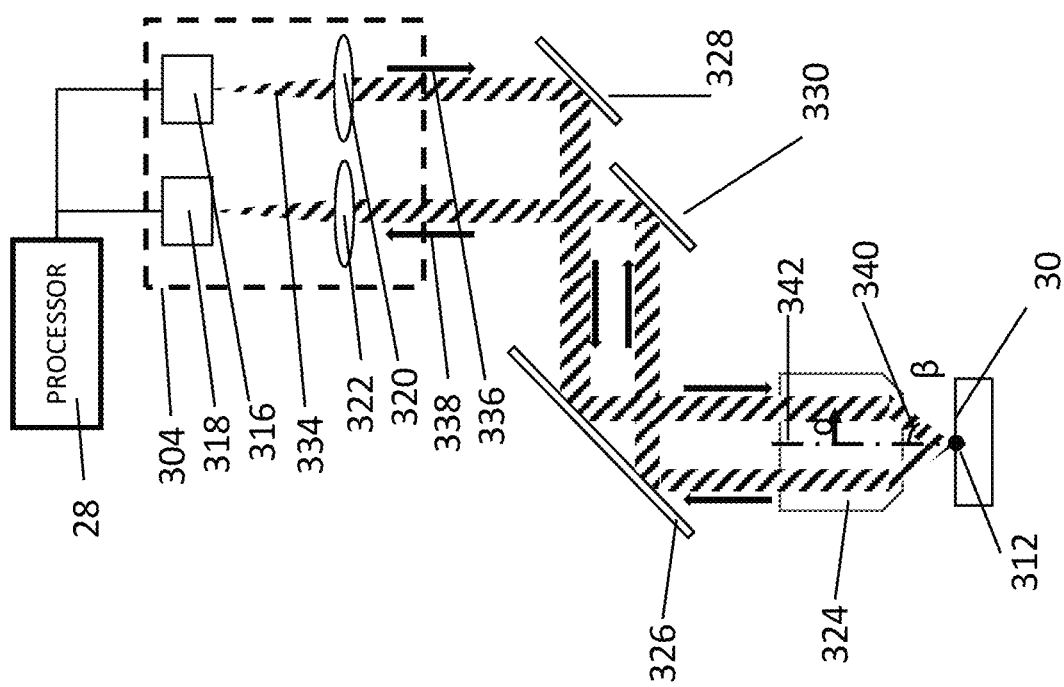

FIGS. 8a, 8b and 8c are schematic illustrations of an optical inspection apparatus 300, in accordance with yet another embodiment of the invention. As in the preceding embodiments, apparatus 300 comprises an interferometer module 302, a triangulation module 304, and beam combining optics 306, along with processor 28. In FIGS. 8a-8c, the beams of light are shown as full beams, rather than using the respective optical axes of the modules as in the preceding embodiments.

Interferometer module 302 is similar to interferometer module 22 in FIG. 2a and interferometer module 82 in FIG. 4, with the exception that a lens 308, which is a part of the interferometer module, is explicitly shown. The rest of interferometer module 302 is schematically shown as a block 310. Lens 308 images area 30 onto the image sensor in interferometer module 302. The remaining components of the interferometer module are omitted for the sake of simplicity.

Triangulation module 304 comprises a projector 316 and an image sensor 318, which are similar in design and operation to projector 90 and sensor 94 in FIG. 4. Triangulation module 304 further comprises lenses 320 and 322, whose functions will be detailed below.

Beam combining optics 306 comprise a high-NA objective lens 324, a plate beamsplitter 326, and two mirrors 328 and 330. Beamsplitter 326 may alternatively comprise a beamsplitter cube. Beamsplitter is typically coated so as to preferentially transmit the beams to and from interferometer module 302, while reflecting the beams to and from triangulation module 304, for example on the basis of polarization and/or wavelength selectivity.

Referring to FIG. 8b, interferometer module 302 emits a beam 314 of coherent light, which is collimated by lens 308. Beam 314 is transmitted by plate beamsplitter 326, and focused by objective lens 324 onto a location 312 in area 30 in a cone of light with a numerical aperture of $NA_i$. Numerical aperture $NA_i$ is defined by an angle 315 between a normal 317 to area 30 and a marginal ray 319 as $NA_i=\sin(\gamma)$, where $\gamma$ is the size of angle 315. Beam 314 is reflected from location 312 back to interferometer module 302.

Referring to FIG. 8c, projector 316 projects fringe patterns in a beam 334, which is collimated by lens 320. The propagation of beam 334 towards area 30 is indicated by an arrow 336. Beam 334 is reflected by mirror 328 and plate beamsplitter 326 toward objective lens 324. Objective lens 324 focuses beam 334 onto location 312 at an angle 340. The size $\beta$ of angle 340 is determined by an offset d of beam 334, before entering objective lens 324, from an optical axis 342 of the objective lens, and a focal length f of the objective lens. $\beta$ is now given as $\beta=\arcsin(d/f)$. Beam 334 returns from location 312 through beamsplitter 326, mirror 330, and lens 322, as indicated by an arrow 338, to sensor 318, which captures an image of the fringe pattern.

The dimensions, positions, and optical parameters of the optical components of apparatus 300 are chosen so that $NA_i<\sin((\beta)$. Consequently, beam 314 of interferometer module 302 and beam 334 of triangulation module 304 are separated in the NA-space (angular space) of objective 324 as well as in their paths within beam combining optics 306.

Fifth Embodiment

Figure 9A:
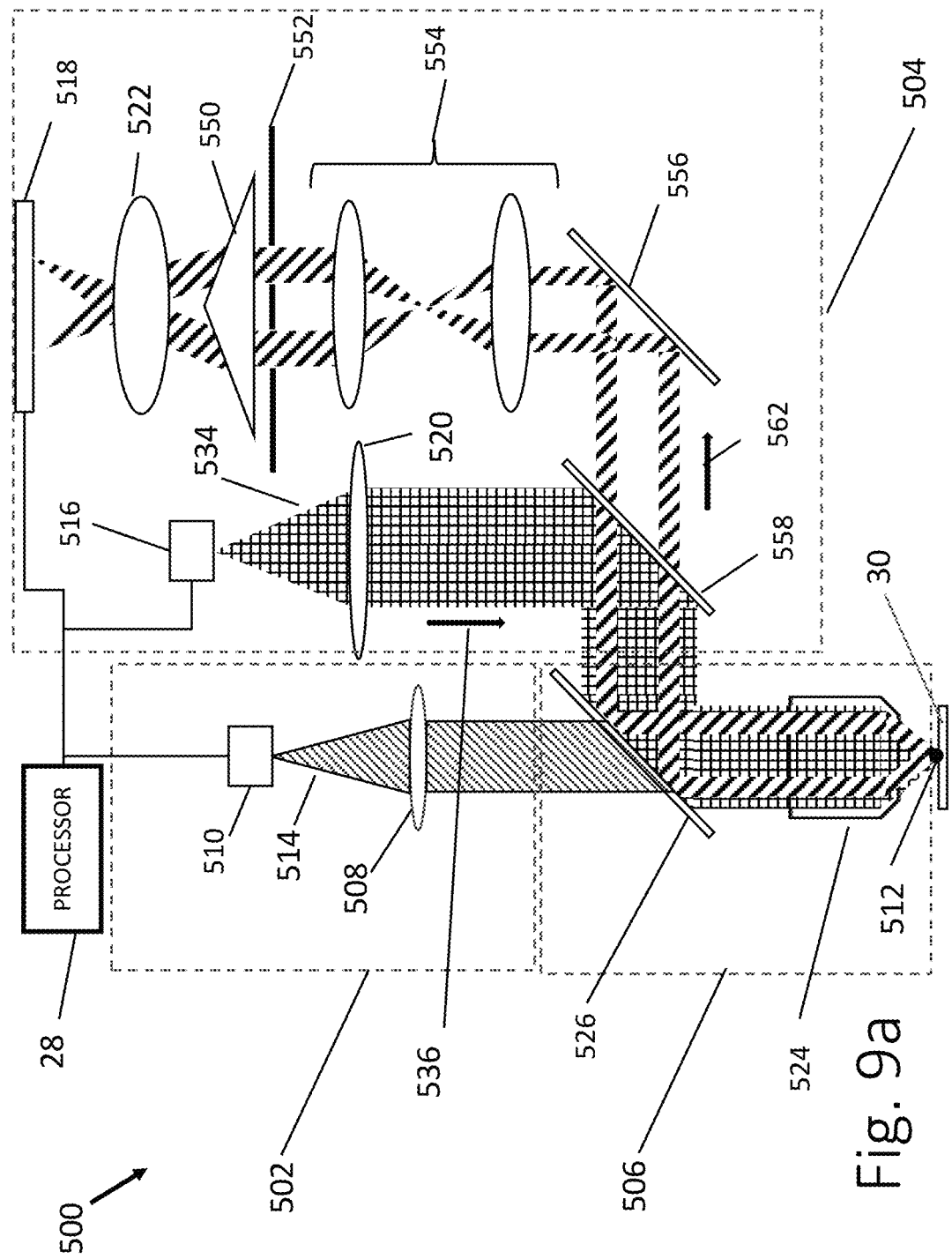
Figure 9B:
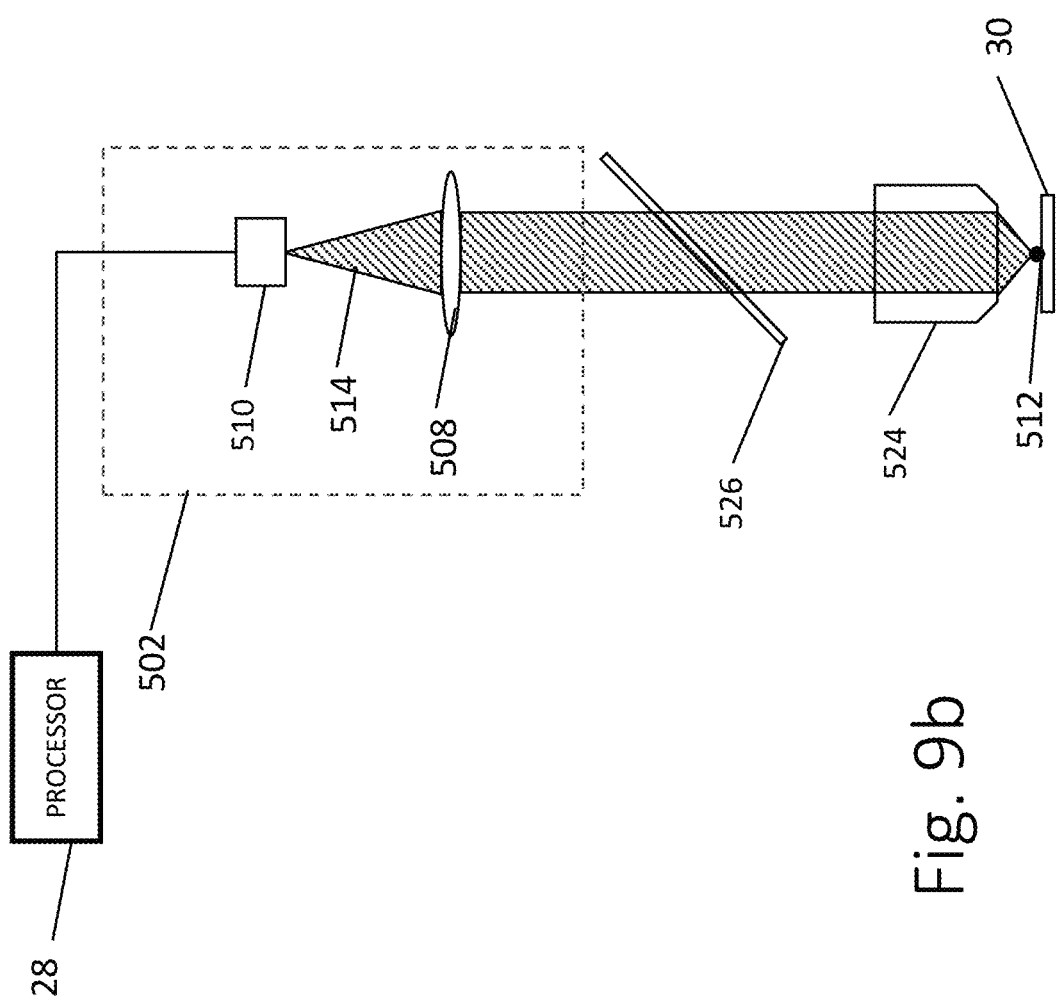
Figure 9D:
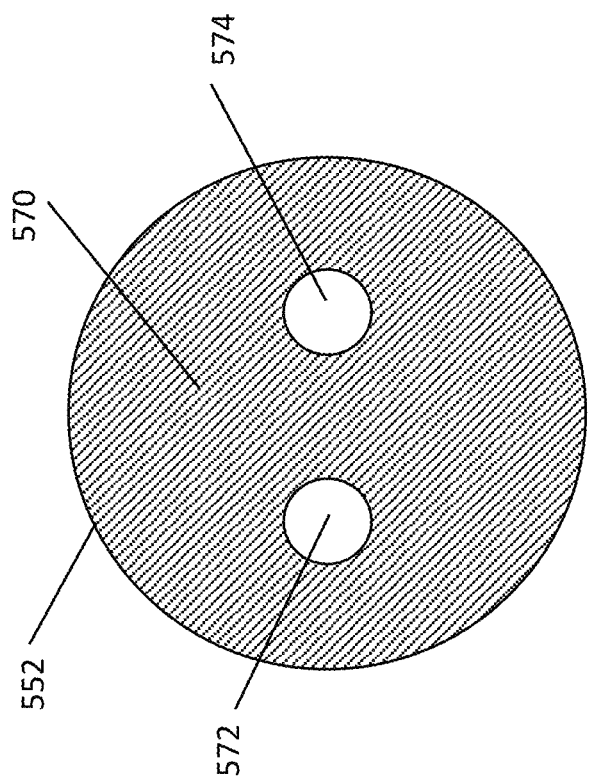
FIG. 9d is a schematic frontal view of an aperture plate used in the apparatus of FIGS. 9a-c, in accordance with an embodiment of the invention.

FIGS. 9a, 9b, 9c and 9d are schematic illustrations of an optical inspection apparatus 500, in accordance with another embodiment of the invention. FIGS. 9a-c are side views of elements of the apparatus, while FIG. 9d is a schematic frontal view of an aperture plate 552 used in the apparatus. As in the preceding embodiments, apparatus 500 comprises an interferometer module 502, a triangulation module 504, and beam combining optics 506, along with processor 28. In FIGS. 9a-9c, the beams of light are shown as full beams (similarly to FIGS. 8a-8c), rather than using the respective optical axes of the modules.

Interferometer module 502 is similar to interferometer module 302 in FIG. 8a, comprising an interferometer block 510 and a lens 508.

Triangulation module 504 comprises a projector 516 and an image sensor 518, which are similar in design and operation to projector 90 and sensor 94 in FIG. 4. Triangulation module 504 further comprises lenses 520 and 522, a double-wedge 550, aperture plate 552 (with apertures 572 and 574 further detailed in FIG. 9d), an optical relay 554, a mirror 556 and a plate beam splitter 558, whose functions will be detailed below.

Beam combining optics 506 comprise a high-NA objective lens 524 and a plate beamsplitter 526. Beamsplitters 526 and 558 may alternatively comprise beamsplitter cubes. Beamsplitter 526 is typically coated so as to preferentially transmit the beams to and from interferometer module 502, while reflecting the beams to and from triangulation module 504, for example on the basis of polarization and/or wavelength selectivity.

Referring to FIG. 9b, interferometer module 502 emits a beam 514 of coherent light, which is collimated by lens 508. Beam 514 is transmitted by beamsplitter 526, and focused by objective lens 524 onto a location 512 in area 30. Beam 514 is reflected from location 512 back to interferometer module 502.

Referring to FIG. 9c, projector 516 projects fringe patterns in a beam 534, which is collimated by lens 520. The propagation of beam 534 towards area 30 is indicated by an arrow 536. Beam 534 is reflected by beamsplitters 558 and 526 toward objective lens 524, which focuses beam 534 onto location 512. Beam 534 returns from location 512 through beamsplitter 526, beamsplitter 558 (by transmission) as indicated by an arrow 562, mirror 556, optical relay 554, apertures 572 and 574 of aperture plate 552, double-wedge 550 and lens 522 to sensor 518, which captures an image of the fringe pattern. In the drawings, only beams 564 and 566, which are transmitted through apertures 572, and 574 are shown in the return light path.

Optical relay 554 images the plane of aperture plate 552 onto an exit pupil 560 of objective 524. Consequently, apertures 572 and 574 of aperture plate 552 determine the angular extent of beams 564 and 566 in the space immediately above area 30.

Double-wedge 550 directs the beams passing through apertures 572 and 574 onto two different locations on imager 518, so as to obtain two fringe-pattern images on the imager. Each of these two images relates to the respective, different angles of beams 564 and 566, and when used together, enable a more robust measurement and improved accuracy.

As shown in FIG. 9d, aperture plate 552 comprises circular apertures 572 and 574 within an optically opaque plate 570. In the pictured embodiment, apertures 572 and 574 are located symmetrically within plate 570, and consequently beams 564 and 566 are symmetrical in the angular space immediately above area 30. Alternatively, aperture plate 552 may contain two or more apertures of different shapes and/or in different positions from those shown in FIG. 9d.

Method for 3D Mapping

Figure 10:
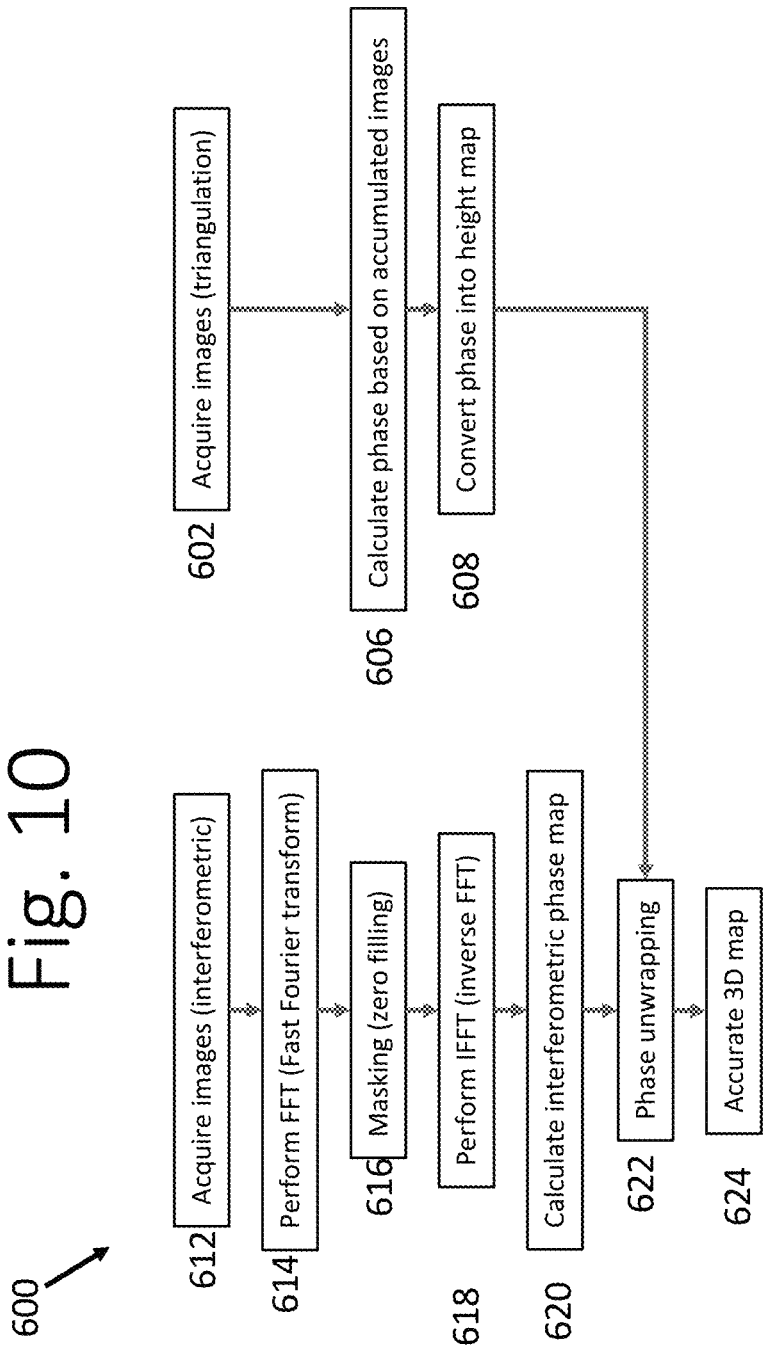
FIG. 10 is a flowchart, which schematically illustrates a method for 3D mapping, in accordance with an embodiment of the invention.

FIG. 10 is a flowchart 600 that schematically illustrates a method for calculation of the interference phase map and the triangulation height map, as well as combining them, in accordance with an embodiment of the invention.

In a triangulation acquisition step 602, processor 28 acquires successive images from triangulation module 24, wherein the successive images are separated by a phase step of the fringe pattern. In a calculation step 606, processor 28 calculates a phase map ø(x,y), for example using Eqn. 1:

$$\emptyset(x, y) = -\operatorname{atan}\frac{\sum_{i=1}^{N} I_i(x, y) \cdot \sin(\delta_i)}{\sum_{i=1}^{N} I_i(x, y) \cdot \cos(\delta_i)}$$

wherein x and y are the spatial coordinates in area 30, N is the number of phase steps, and $\delta_i$ is the phase of the $i^{th}$ step. Alternatively, in embodiments in which two or more different patterns are used, as explained above, this formula may be modified accordingly for faster and more accurate calculation. When recording two image patterns (as illustrated in FIG. 9c), processor 28 may process both patterns. This allows compensation for lateral image shifts, and can therefore achieve enhanced accuracy and robustness.

In a conversion step 608, the calculated phase map ø(x,y) is converted into a height map ΔZ(x,y) through Eqn. 2:

$$\Delta Z(x, y) = \frac{\emptyset(x, y)}{2 \cdot \pi \cdot \tan(\gamma)} \cdot \lambda_{fr}$$

wherein γ is a so-called triangulation angle (the angle between the optical axis of the fringe pattern incident onto area 30 and the optical axes of the reflected fringe pattern), and $\lambda_{fr}$ is the period of the projected fringe pattern.

In an interferometric acquisition step 612, processor 28 acquires images from interferometer module 22. In a FFT step 614, processor 28 performs a Fast Fourier transform (FFT) analysis on the acquired images. In a masking step 616, processor 28 masks the resulting FFT data, to include only the relevant frequencies (around the expected fringe frequency) and fills the rest of data with zeros. In an IFFT step 618, processor performs an inverse FFT on the masked results from step 616. In a phase calculation step 620, processor 28 calculates the phase for each point resulting from IFFT step 618. An interferometric phase map is calculated from the results of IFFT step 618 in a phase map step 620. The phase map resulting from phase map step 620 has phase values within a range of 2π, i.e., it is a modulo(2π) phase map. In an unwrapping step 622, processor 28 calculates a height map from the modulo(2π) phase map, and adds or subtracts height increments corresponding to the ambiguity range, until the height at each point is closest to the triangulation height map at that point.

In a 3D map step 624, processor 28 calculates the final 3D map of area 30 by converting the unwrapped phase to height. For this purpose, the processor multiplies the phase at each point (x,y) by λ/2π, wherein λ is the wavelength of the coherent beam of interferometer module 22. When two wavelengths $\lambda_1$ and $\lambda_2$ are employed for the interferometric measurement, a wavelength $\Lambda=(\lambda_1 \times \lambda_2)/(\lambda_2-\lambda_1)$ is used for converting phase to height.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical inspection apparatus, comprising:
    an interferometer module, which is configured to direct a beam of coherent light toward an area under inspection, to receive the beam reflected from the area, and to produce a first image of interference fringes produced by combining the reflected beam with a reference beam;
    a triangulation module, comprising a projector configured to project a pattern of structured light onto the area under inspection;
    at least one image sensor configured to capture the first image of the interference fringes and a second image of the pattern that is reflected from the area under inspection;
    beam combiner optics, which are configured to direct the beam of coherent light along a first optical axis to impinge on a location on the area under inspection at a first angle of incidence, and to direct the projected pattern to impinge on the location along a second optical axis, at a second angle of incidence that is different from the first angle of incidence; and
    a processor configured to process the first and second images in order to extract respective first and second three-dimensional (3D) measurements of the area under inspection, and to combine the first and second 3D measurements in order to generate a 3D map of the area.

2. The apparatus according to claim 1, and comprising a scanning mechanism configured to translate the first and second optical axes across the area under inspection.

3. The apparatus according to claim 1, wherein the first 3D measurements are characterized by a first resolution and a first ambiguity range, while the second 3D measurements are characterized by a second resolution that is coarser than the first resolution and a second ambiguity range that is greater than the first ambiguity range, and the processor is configured to combine the first and second 3D measurements so that the 3D map represents the area with the first resolution over the second ambiguity range.

4. The apparatus according to claim 1, wherein the first angle of incidence is normal to a surface of the area under inspection, while the second angle of incidence is oblique.

5. The apparatus according to claim 4, and comprising an objective lens configured to direct both the beam of coherent light and the projected pattern onto the location, wherein a numerical aperture of the objective lens includes a central portion serving the interferometer module and a peripheral portion serving the triangulation module.

6. The apparatus according to claim 4, wherein the at least one image sensor comprises a first image sensor positioned to capture the first image and a second image sensor positioned to capture the second image, and wherein the beam combiner optics are further configured to direct the pattern that is reflected from the area under inspection toward the second image sensor along an oblique angle of departure corresponding to the second angle of incidence.

7. The apparatus according to claim 1, wherein the triangulation module is configured to direct two beams from the area under inspection at different, respective angles to form respective images of the pattern on the at least one image sensor, and the processor is configured to process the respective images together in order to generate the 3D map.

8. The apparatus according to claim 7, wherein the triangulation module comprises an aperture plate, which is positioned so as to intercept the reflected pattern and contains two apertures that direct the two beams at the different respective angles toward the at least one image sensor, and further comprising an objective lens configured to receive and direct the reflected pattern toward the at least one image sensor, wherein the triangulation module images the aperture plate onto an exit pupil of the objective lens and comprises a double-wedge configured to direct the two beams respectively through the two apertures.

9. The apparatus according to claim 1, wherein the beam combiner optics comprise a plurality of optical prisms, which are configured to reflect at least one of the beam of coherent light and the projected pattern so as to direct the beam of coherent light and the projected pattern toward the location at the first and second angles of incidence.

10. The apparatus according to claim 1, wherein the processor is configured to make the first 3D measurements by measuring first displacements of the interference fringes in the first image relative to a first reference, and to make the second 3D measurements by measuring second displacements of the pattern of the structured light in the second image relative to a second reference.

11. The apparatus according to claim 1, wherein the interferometer module comprises a light source configured to emit the coherent light, and the at least one image sensor is configured to capture the first image of the interference fringes.

12. The apparatus according to claim 11, wherein the at least one image sensor is configured to capture a two-dimensional (2D) image of the area under inspection, and wherein the processor is configured to segment and analyze the 2D image so as to identify one or more objects in the area, and to apply the first and second 3D measurements in measuring a height of the one or more identified objects.

13. The apparatus according to claim 11, wherein the at least one image sensor comprises a single image sensor that is configured to capture both the first image of the interference fringes and the second image of the pattern that is reflected from the area under inspection.

14. The apparatus according to claim 13, further comprising a further image sensor configured to capture a third image of the pattern that is reflected from the area under inspection along an oblique angle of departure corresponding to the second angle of incidence, and wherein the processor is configured to process the third image in order to make further 3D measurements of the area under inspection.

15. The apparatus according to claim 1, wherein the interferometer module is configured to produce the first image by self-referenced digital holography.

16. The apparatus according to claim 1, wherein the interferometer module is configured to produce the first image by directing two beams of the coherent light with different illumination conditions to impinge on the area under inspection, wherein one of the beams serves as the reference beam.

17. The apparatus according to claim 1, wherein the interferometer module is configured to derive the reference beam from the beam of the coherent light by optical manipulation of the beam.

18. The apparatus according to claim 1, wherein the triangulation module comprises at least one rotatable polarizer, which is configured to vary a polarization state of the projected pattern so as to adjust relative intensities of specular and diffuse reflections in the second image.

19. The apparatus according to claim 1, wherein the interferometer module is configured to capture the first image using a digital holographic method.

20. The apparatus according to claim 1, wherein the triangulation module is configured to capture the second image using a scanning-phase shift method (SPSM).

21. An optical inspection apparatus, comprising:
an interferometer module, which is configured to direct a beam of coherent light along a first optical axis to impinge on an area under inspection, to receive the beam reflected from the area, and to produce a first image of interference fringes produced by combining the reflected beam with a reference beam;
a triangulation module, comprising a projector configured to project a pattern of structured light along a second optical axis to impinge on the area under inspection;
at least one image sensor configured to capture the first image of the interference fringes and a second image of the pattern that is reflected from the area under inspection;
a scanning mechanism configured to translate the first and second optical axes in mutual registration across the area under inspection; and
a processor configured to drive the scanning mechanism so as to cause the first and second optical axes to impinge in succession on locations in the area under inspection, to process the first and second images in order to extract respective first and second three-dimensional (3D) measurements of the area under inspection, and to combine the first and second 3D measurements in order to generate a 3D map of the area.

22. A method for optical inspection, comprising:
directing a beam of coherent light toward an area under inspection, receiving the beam reflected from the area, and capturing a first image of interference fringes produced by combining the reflected beam with a reference beam;
projecting a pattern of structured light onto the area under inspection, and capturing a second image of the pattern that is reflected from the area under inspection;
positioning beam combiner optics to direct the beam of coherent light along a first optical axis to impinge on a location on the area under inspection at a first angle of incidence, and to direct the projected pattern to impinge on the location along a second optical axis, at a second angle of incidence that is different from the first angle of incidence;
processing the first and second images in order to extract respective first and second three-dimensional (3D) measurements of the area under inspection; and
combining the first and second 3D measurements in order to generate a 3D map of the area.

23. The method according to claim 22, further comprising scanning the first and second optical axes across the area under inspection.

24. The method according to claim 22, wherein the first 3D measurements are characterized by a first resolution and a first ambiguity range, while the second 3D measurements are characterized by a second resolution that is coarser than the first resolution and a second ambiguity range that is greater than the first ambiguity range, and combining the first and second 3D measurements comprises generating the 3D map so as to represent the area with the first resolution over the second ambiguity range.

25. The method according to claim 22, wherein the first angle of incidence is normal to a surface of the area under inspection, while the second angle of incidence is oblique.

26. The method according to claim 25, wherein directing the beam of coherent light comprises focusing the beam onto the location through a central portion of a numerical aperture of an objective lens, and projecting the pattern comprises focusing the projected pattern onto the location through a peripheral portion of the numerical aperture of the objective lens.

27. The method according to claim 22, wherein capturing the second image comprises directing two beams from the area under inspection at different, respective angles to form respective images of the pattern, and wherein processing the first and second images comprises processing the respective images together in order to extract the second 3D measurements.

28. The method according to claim 27, wherein directing the two beams comprises positioning two apertures to intercept the reflected pattern and direct the two beams at the different respective angles toward at least one image sensor.

29. The method according to claim 27, wherein directing the two beams comprises positioning an objective lens to receive and direct the reflected pattern toward the at least one image sensor, wherein the apertures are imaged onto an exit pupil of the objective lens, and positioning a double-wedge to direct the two beams respectively through the two apertures.

30. The method according to claim 25, wherein the beam combiner optics are further configured to direct the pattern that is reflected from the area under inspection toward an image sensor, which captures the second image, along an oblique angle of departure corresponding to the second angle of incidence.

31. The method according to claim 22, wherein the beam combiner optics comprise a plurality of optical prisms, which are configured to reflect at least one of the beam of coherent light and the projected pattern so as to direct the beam of coherent light and the projected pattern toward the location at the first and second angles of incidence.

32. The method according to claim 22, wherein the processing the first image comprises measuring first displacements of the interference fringes in the first image relative to a first reference, while processing the second image comprises measuring second displacements of the pattern of the structured light in the second image relative to a second reference.

33. The method according to claim 22, wherein capturing the first image comprises forming the interference fringes on an image sensor in an interferometer module.

34. The method according to claim 33, further comprising, using the image sensor, capturing a two-dimensional (2D) image of the area under inspection, and further comprising segmenting and analyzing the 2D image so as to identify one or more objects in the area, wherein combining the first and second 3D measurements comprises applying the first and second 3D measurements in measuring a height of the one or more identified objects.

35. The method according to claim 33, wherein the image sensor comprises a single image sensor that is configured to capture both the first image of the interference fringes and the second image of the pattern that is reflected from the area under inspection.

36. The method according to claim 35, further comprising capturing a third image of the pattern that is reflected from the area under inspection along an oblique angle of departure corresponding to the second angle of incidence, and processing the third image in order to make further 3D measurements of the area under inspection.

37. The method according to claim 22, wherein capturing the first image comprises producing the first image by self-referenced digital holography.

38. The method according to claim 22, wherein capturing the first image comprises producing the first image by directing two beams of the coherent light with different illumination conditions to impinge on the area under inspection, wherein one of the beams serves as the reference beam.

39. The method according to claim 22, wherein capturing the first image comprises deriving the reference beam from the beam of the coherent light by optical manipulation of the beam.

40. The method according to claim 35, wherein projecting the pattern comprises varying a polarization state of the projected pattern so as to adjust relative intensities of specular and diffuse reflections in the second image.

41. The method according to claim 22, wherein capturing the first image comprises applying a digital holographic method to the area under inspection.

42. The method according to claim 22, wherein capturing the second image comprises applying a scanning-phase shift method (SPSM) to the area under inspection.

43. A method for optical inspection, comprising:
directing a beam of coherent light along a first optical axis to impinge an area under inspection, receiving the beam reflected from the area, and capturing a first image of interference fringes produced by combining the reflected beam with a reference beam;
projecting a pattern of structured light along a second optical axis to impinge the area under inspection, and capturing a second image of the pattern that is reflected from the area under inspection;
translating the first and second optical axes in mutual registration across the area under inspection so as to cause the first and second optical axes to impinge in succession on locations in the area under inspection;
processing the first and second images in order to extract respective first and second three-dimensional (3D) measurements of the area under inspection; and
combining the first and second 3D measurements in order to generate a 3D map of the area.

\* \* \* \* \*